US 8,972,959 B2

(12) United States Patent  
Ishizaki

(10) Patent No.: US 8,972,959 B2  
(45) Date of Patent: Mar. 3, 2015

(54) METHOD OF CONVERTING PROGRAM CODE OF PROGRAM RUNNING IN MULTI-THREAD TO PROGRAM CODE CAUSING LESS LOCK COLLISIONS, COMPUTER PROGRAM AND COMPUTER SYSTEM FOR THE SAME

(75) Inventor: Kazuaki Ishizaki, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 1209 days.

(21) Appl. No.: 12/767,843

(22) Filed: Apr. 27, 2010

(65) Prior Publication Data

US 2010/0275190 A1   Oct. 28, 2010

(30) Foreign Application Priority Data

Apr. 28, 2009   (JP) .................. 2009-109937

(51) Int. Cl.  
*G06F 9/45* (2006.01)
(52) U.S. Cl.  
CPC ...................................... *G06F 8/458* (2013.01)  
USPC ............ 717/149; 717/143; 717/152; 717/159
(58) Field of Classification Search  
None  
See application file for complete search history.

(56) References Cited

U.S. PATENT DOCUMENTS

| 5,093,916 | A | * | 3/1992 | Karp et al. ..................... 719/331 |
| 5,442,790 | A | * | 8/1995 | Nosenchuck ................. 717/155 |
| 5,450,554 | A | * | 9/1995 | Zaiki ............................. 717/156 |
| 5,579,494 | A | * | 11/1996 | Zaiki ............................. 712/241 |
| 5,852,734 | A | * | 12/1998 | Komatsu et al. .............. 717/156 |
| 5,875,337 | A |   | 2/1999 | Miyano |
| 5,999,739 | A | * | 12/1999 | Soni et al. ..................... 717/156 |
| 6,110,224 | A | * | 8/2000 | Kawabe et al. ................ 717/131 |
| 6,374,403 | B1 | * | 4/2002 | Darte et al. ................... 717/161 |
| 6,438,747 | B1 | * | 8/2002 | Schreiber et al. ............. 717/160 |
| 6,496,975 | B1 | * | 12/2002 | Slinger ......................... 717/126 |

(Continued)

FOREIGN PATENT DOCUMENTS

| JP | 4-75136 A | 3/1992 |
| JP | 5-66972 A | 3/1993 |

(Continued)

OTHER PUBLICATIONS

Lewis et al., Multithreaded SAT Solving, published by IEEE, pp. 926-931, 2007.*

(Continued)

*Primary Examiner* — Tuan Q. Dam  
*Assistant Examiner* — Zheng Wei  
(74) *Attorney, Agent, or Firm* — Cantor Colburn LLP

(57) ABSTRACT

A method of converting a program code of a program running in multi-thread to a program code which causes fewer lock collisions. The method includes reading the program code into a memory and searching the program code for a first conditional statement making a branch to a path, which is in a synchronized block and has no side effect on the synchronized block; duplicating the path having no side effect to which the branch is made by the searched first conditional statement into the outside of the synchronized block; and adding a second conditional statement into the program code in response to the duplication, wherein the second conditional statement is a conditional statement making a branch to the duplicated path having no side effect. Also provided is a system and an article of manufacture which causes a computer to carry out the steps of the above method.

21 Claims, 13 Drawing Sheets

(56) References Cited

U.S. PATENT DOCUMENTS

| | | | |
|---|---|---|---|
| 6,530,079 B1* | 3/2003 | Midkiff et al. | 717/158 |
| 6,564,354 B1* | 5/2003 | Wang et al. | 716/103 |
| 6,735,763 B1* | 5/2004 | Enokida | 717/143 |
| 6,748,589 B1* | 6/2004 | Johnson et al. | 717/150 |
| 6,851,109 B1* | 2/2005 | Alexander et al. | 717/148 |
| 6,988,266 B2* | 1/2006 | Lam et al. | 717/160 |
| 7,076,776 B2* | 7/2006 | Kim et al. | 717/160 |
| 7,240,337 B2* | 7/2007 | Kawahito et al. | 717/136 |
| 7,316,010 B1* | 1/2008 | Daynes et al. | 717/140 |
| 7,451,438 B2* | 11/2008 | Kielstra et al. | 717/154 |
| 7,577,936 B2* | 8/2009 | Koseki et al. | 717/108 |
| 7,716,657 B2* | 5/2010 | Inglis et al. | 717/151 |
| 7,784,039 B2* | 8/2010 | Tanaka | 717/151 |
| 7,797,690 B2* | 9/2010 | Nesbitt et al. | 717/153 |
| 7,853,937 B2* | 12/2010 | Janczewski | 717/149 |
| 7,861,237 B2* | 12/2010 | Tarditi et al. | 717/151 |
| 8,141,054 B2* | 3/2012 | Dolby et al. | 717/130 |
| 8,296,747 B2* | 10/2012 | Ishizaki et al. | 717/151 |
| 8,332,831 B1* | 12/2012 | Metzgen | 717/149 |
| 8,464,217 B2* | 6/2013 | Janczewski | 717/116 |
| 8,473,934 B2* | 6/2013 | Brockmeyer et al. | 717/149 |
| 2002/0062476 A1* | 5/2002 | Saxe et al. | 717/126 |
| 2003/0097653 A1* | 5/2003 | Kim et al. | 717/160 |
| 2004/0015915 A1* | 1/2004 | Lam et al. | 717/150 |
| 2005/0138611 A1* | 6/2005 | Inglis et al. | 717/151 |
| 2005/0198626 A1* | 9/2005 | Kielstra et al. | 717/156 |
| 2005/0231397 A1* | 10/2005 | Koseki et al. | 341/50 |
| 2006/0064682 A1* | 3/2006 | Tanaka | 717/161 |
| 2006/0143429 A1* | 6/2006 | Nishiyama et al. | 712/209 |
| 2007/0169042 A1* | 7/2007 | Janczewski | 717/149 |
| 2008/0059875 A1* | 3/2008 | Ishizaki et al. | 715/256 |
| 2010/0205585 A1* | 8/2010 | McAllister et al. | 717/140 |
| 2011/0004869 A1* | 1/2011 | Kawahito et al. | 717/151 |
| 2011/0067014 A1* | 3/2011 | Song et al. | 717/149 |
| 2011/0119660 A1* | 5/2011 | Tanaka | 717/149 |
| 2011/0167416 A1* | 7/2011 | Sager et al. | 717/149 |
| 2011/0209129 A1* | 8/2011 | Komatsu et al. | 717/149 |
| 2012/0159464 A1* | 6/2012 | Demetriou et al. | 717/148 |

FOREIGN PATENT DOCUMENTS

| | | |
|---|---|---|
| JP | H10328959 A | 12/1998 |
| JP | 11-288367 A | 10/1999 |
| JP | 2000-276343 A | 10/2000 |
| JP | 2000276343 A | 10/2000 |
| JP | 2001103836 | 4/2001 |
| JP | 2002297396 A | 10/2002 |
| JP | 4075136 B2 | 4/2008 |
| JP | 2009-32233 A | 2/2009 |
| JP | 2009032233 A | 2/2009 |

OTHER PUBLICATIONS

Praun et al., Static Conflict Analysis for Mutli-Threaded Object-Oriented Programs, publihsed by ACM PLDI'03, Jun. 9-11, 2003, pp. 115-128.*

M. Vechev and E. Yahav Deriving Linearizable Fine-Grained Concurrent Objects, PLDI'08, Jun. 7-13, 2008, Tucson, Arizona, USA. Copyright c° 2008 ACM 978-1-59593-860—Feb. 8, 2006.

Espacenet—Bibliographic Data—English Abstract of JP5066972(B2); dated Nov. 7, 2012; located at http://worldwideespacenet.com/publicationDetails/biblio?FT=D&date=20121107&DB-wo, downloaded Jul. 8, 2013; 1 page.

JPH09138781(A) Abstract, Publication Date: May 27, 1997; Applicant: NEC Corp.; US Equlivant 5875337 cited above, 1 pg.

* cited by examiner

```
public class W { Object val; W next; }
public class X {
    private W head = null;                              //D01
    private Object lock = new Object();                 //D02 void enqueue(W w, Foo foo) {                        //S00
        synchronized (w) {                              //S01
            if (w.val == null) return;                  //S02
            synchronized (lock) {                       //S03
                w.next = (head == null) ? W : head;     //S04
                head = w;                               //S05
                foo.bar(lock);                          //S06
            }                                           //S07
        }                                               //S08
    }                                                   //S09 public W dequeue() {                                //T00
        synchronized (lock) {                           //T01
            if (head != null) {                         //T02
                W w = head;                             //T03
                head = (w.next == w) ? null : w.next;   //T04
                w.next = w;                             //T05
                return w;                               //T06
            }                                           //T07
            return null;                                //T08
        }                                               //T09
    }                                                   //T10
}
```

FIG. 4A

```
public W dequeue() {                                //T00
    if (b 1) {
        synchronized (lock) {                       //T01
            if (head != null) {                     //T02
                W w = head;                         //T03
                head = (w.next == w) ? null : w.next; //T04
                w.next = w;                         //T05
                return w;                           //T06
            }                                       //T07
            return null;                            //T08
        }                                           //T09
    }
    return null;
}                                                   //T10
```

411

412 (pointing to `if (b 1) {`)
412 (pointing to `}`)
412 (pointing to `return null;`)

```
public class W { Object val; W next; }
public class R {
    private W head = null;                              //D01
    private Object lock = new Object();                 //D02
    private boolean b_1= (head != null);

void enqueue(W w, Foo foo) {                        //S00
        synchronized (w) {                              //S01
            if (w.val == null) return;                  //S02
            synchronized (lock) {                       //S03
                w.next = (head == null) ? W : head;     //S04
                head = w;                               //S05
                foo.bar(lock);                          //S06
                b_1= (head != null);
            }                                           //S07
        }                                               //S08
    }                                                   //S09 public W dequeue() {                                //T00
        if (b_1) {
            synchronized (lock) {                       //T01
                If (head != null) {                     //T02
                    W w = head;                         //T03
                    head = (w.next == w) ? null : w.next; //T04
                    w.next = w;                         //T05
                    b_1= (head != null) ;
                    return w;                           //T06
                }                                       //T07
                b_1= (head != null) ;
                return null;                            //T08
            }                                           //T09
        }
        return null;
    }                                                   //T10
}
```

```
public class W { Object val; W next; }
public class X {
    private W head = null;                              //D01
    private Object lock = new Object();                 //D02 boolean enqueue(W w) {                              //S00
        synchronized (w) {                              //S01
            if (w.val == null) return false;            //S02
            synchronized (lock) {                       //S03
                w.next = (head == null) ? W : head;     //S04
                head = w;                               //S05
                return true;                            //S06
            }                                           //S07
        }                                               //S08
    }                                                   //S09 public W dequeue() {                                //T00
        synchronized (lock) {                           //T01
            if (head != null) {                         //T02
                W w = head;                             //T03
                head = (w.next == w) ? null : w.next;   //T04
                w.next = w;                             //T05
                return w;                               //T06
            }                                           //T07
            return null;                                //T08
        }                                               //T09
    }                                                   //T10
}
```

```
public W dequeue() {                                 //T00
    if (b1) {
        synchronized (lock) {                        //T01
            if (head != null) {                      //T02
                W w = head;                          //T03
                head = (w.next == w) ? null : w.next; //T04
                w.next = w;                          //T05
                return w;                            //T06
            }                                        //T07
            return null;                             //T08
        }                                            //T09
        return null;
    }                                                //T10
}
```

511

512 (if (b1) {)
512 (})
512 (return null;)

```
public class W { Object val; W next; }
public class R {
    private W head = null;                              //D01
    private Object lock = new Object();                 //D02
    private boolean b_1 = (head != null);
                                        ↖ 522 boolean enqueue(W w) {                              //S00
        synchronized (w) {                              //S01
            if (w.val == null) return false;            //S02
            synchronized (lock) {                       //S03
                w.next = (head == null) ? w : head;     //S04
                head = w;                               //S05
                b_1= (head != null);
                return true;                            //S06
            }                              ↖ 522       //S07
        }                                               //S08
    }                                                   //S09 public W dequeue() {                                //T00
        if (b_1) {
    522 ↗   synchronized (lock) {                       //T01
                if (head != null) {                     //T02
                    W w = head;                         //T03
                    head = (w.next == w) ? null : w.next; //T04
                    w.next = w;                         //T05
                    b_1= (head != null) ;
                    return w;                           //T06
                }                          ↖ 522       //T07
                b_1= (head != null) ;
                return null;                            //T08
    522         }                          ↖ 522       //T09
          ↘ }
            return null;
        }                                               //T10
    }
}
```

```
//c1 AND c2 ARE local VARIABLES
synchronized (obj) {
    if ((x ==0)) {
        if (y ==0) {
            x++;          ⎫ 6 0 2
            y--;          ⎭
        } else {
            c2++;         ⎬ 6 0 3
        }
    } else {
        c1++;             ⎬ 6 0 4
    }
}
```

611

```
volatile int b = 0    ← 6 1 2
if (b == 1) { c1++;}
else if (b == 2) { c2++;}   ⟶ 6 1 3
else { // b == 0
    synchronized (obj) {
        if ((x ==0)) {
            if (y ==0) {
                x++;
                y--;
                b = (x !== 0) ? 1 : (y != 0) ? 2 : 0;
            } else {                              ↖ 6 1 4
                c2++;
            }
        } else {
            c1++;
        }
6 1 3   }
  ↘ }
```

FIG. 6

METHOD OF CONVERTING PROGRAM CODE OF PROGRAM RUNNING IN MULTI-THREAD TO PROGRAM CODE CAUSING LESS LOCK COLLISIONS, COMPUTER PROGRAM AND COMPUTER SYSTEM FOR THE SAME

CROSS REFERENCE TO RELATED APPLICATION

This application claims priority under 35 U.S.C. §119 from Japanese Patent Application No. 2009109937 filed Apr. 28, 2009, the entire contents of which are incorporated herein by reference.

BACKGROUND OF THE INVENTION

1. Field of the Invention

The present invention relates to a method, a computer program and a computer system for converting a program code running in multi-thread to a program code causing fewer lock collisions.

2. Description of the Related Art

In recent years, there has been an accelerated shift to so-called multi-core processor architectures, in which one central processing unit ("CPU") includes a plurality of CPU cores. The multi-core is externally recognized as a single CPU, but internally recognized as more than one CPU. Multi-core technology enables an increase in computing performance of the entire CPU chip mainly through performing parallel processing. Multi-core technology drastically increases the number of hardware threads simultaneously executable by the processor. For example, Sun™ Niagara 2™ can execute 64 threads on a single CPU.

If a conventional program is executed on a processor capable of executing a plurality of threads simultaneously, there is a problem of performance deterioration in the processor caused by a lock collision. Lock collision refers to a state where, if a lock is acquired to enter a critical section requiring exclusive execution in one thread, the next step is not executed in other threads until the above lock is released. The thread in which the next step is not executed typically enters a spin loop or sleep state.

There are various causes of lock collision. Consideration will be given to a program in which retrieving data from a queue is frequently executed in a plurality of threads. Further, consideration will be given to a case where a statement on retrieval processing is described in a synchronized block for describing the processing which requires exclusive execution in the program code. The foregoing program acquires a lock every time the retrieving processing is invoked during run time of the program. Therefore, a lock collision frequently occurs. Accordingly, frequently occurring lock collisions cause system performance problems.

In June of 2007, the Sun™ Bug database reported as a bug a program having a program code structured similar to the above program code when the program acts as a bottleneck to system performance in a computer system capable of executing 32 hardware threads. In the report, the above problem is identified in the java.lang.ref.RereferenceQueue class of Sun JDK 1.5.0_13 having similarly-structured program code.

The poll( ) method corresponding to retrieval processing is a method of the above class and is modified in Sun JDK1.5.0_14. In the modification, a statement on the process of determining whether or not the queue is empty and exiting from the method if the queue is determined to be empty is inserted before a statement acquiring a lock in the implementation of the poll( ) method.

Martin Vechev, Eran Yahav, Deriving Linearizable Fine-Grained Concurrent Objects, PLDI'08, ACM 978-1-59593-860-2/08/06, Jun. 7 to 13, 2008 describes program code that is convertible to a program code having high concurrency by adding a marked bit to the program code and using the added marked bit and a compareAndSwap (CAS) instruction. The marked bit is added manually.

SUMMARY OF THE INVENTION

At every occurrence of performance deterioration caused by a lock collision, it is necessary to identify the cause of the problem and to modify the program code manually. This work, however, is almost impossible because a great deal of workload is required when considering the amount of existing program codes. Therefore, there is a need for a method of automatically identifying parts likely to cause performance deterioration and automatically modifying the parts.

According to an embodiment of the invention, a method of converting a program code running in multi-thread to a program code causing fewer lock collisions is provided. The method includes:

reading the program code into a memory;

searching the program code for a first conditional statement making a branch to a path, wherein the path is in a synchronized block and has no side effect on the synchronized block;

duplicating the path having no side effect to the outside of the synchronized block; and adding a second conditional statement into the program code in response to the duplication, wherein the second conditional statement is a conditional statement making a branch to the duplicated path having no side effect.

According to another embodiment of the invention, a computer program product for converting a program code of a program running in a multi-thread to a program code fewer less lock collisions is provided. The computer program product includes:

a computer readable storage medium having computer readable program code embodied therewith, the computer readable program code configured to execute a method, the method including:

reading the program code into a memory and searching the readout program code for a first conditional statement making a branch to a path, wherein the path is in a synchronized block and has no side effect on the synchronized block;

duplicating the path having no side effect to the outside of the synchronized block; and adding a second conditional statement into the program code in response to the duplication, wherein the second conditional statement is a conditional statement making a branch to the duplicated path having no side effect.

According to yet another embodiment of the invention, a computer system for converting a program code of a program running in a multi-thread to a program code fewer less lock collisions, is provided. The computer system includes:

a computer readable storage medium having computer readable program code embodied therewith;

a search unit for reading the program code into a memory and searching the program code for a first conditional statement making a branch to a path, which is in a synchronized block and has no side effect on the synchronized block, wherein the term "no side effect" means that a value under processing by a statement in the synchronized block is unable to be referenced by a statement outside the synchronized block;

a duplicating unit for duplicating the path having no side effect to which the branch is made by the searched first conditional statement into the outside of the synchronized block; and an addition unit for adding a second conditional statement into the program code in response to the duplication, wherein the second conditional statement is a conditional statement making a branch to the duplicated path having no side effect.

According to the embodiments of the present invention, it is possible to automatically find a second path which is executable even if a lock is not acquired, out of the first path in a synchronized block. Then, the found second path and a conditional statement for causing the execution of the second path without acquiring a lock are added to the outside of the first path in the program code. The addition reduces the lock collision time during program code execution and prevents deterioration in CPU efficiency in a multi-thread.

BRIEF DESCRIPTION OF THE DRAWINGS

FIG. 4A is a diagram illustrating input data CL for use in concretely describing the operations of steps shown in FIGS. 3A to 3C according to the embodiment of the present invention.

FIG. 4B is a diagram illustrating a method dequeue( ) after the execution of the processing of step 316 shown in FIG. 3B according to the embodiment of the present invention.

FIG. 4C is a diagram illustrating input data after the execution of the processing of steps shown in FIGS. 3A to 3C (the program code after the conversion) with respect to FIG. 4A according to the embodiment of the present invention.

FIG. 5A is a diagram illustrating input data CL for use in concretely describing the operations of steps shown in FIGS. 3A to 3C according to the embodiment of the present invention.

FIG. 5B is a diagram illustrating a method dequeue( ) after the execution of the processing of step 316 shown in FIG. 3B according to the embodiment of the present invention.

FIG. 5C is a diagram illustrating input data after the execution of the processing of steps shown in FIGS. 3A to 3C (the program code after the conversion) with respect to FIG. 5A according to the embodiment of the present invention.

FIG. 6 is a diagram illustrating a part of the program code before the execution of the processing of steps shown in FIGS. 3A to 3C and a part of the program code after the execution of the processing of steps shown in FIGS. 3A to 3C in the case where there are three or more paths to be selected by a first conditional expression, according to the embodiment of the present invention.

DETAILED DESCRIPTION OF THE INVENTION

Figure 1:
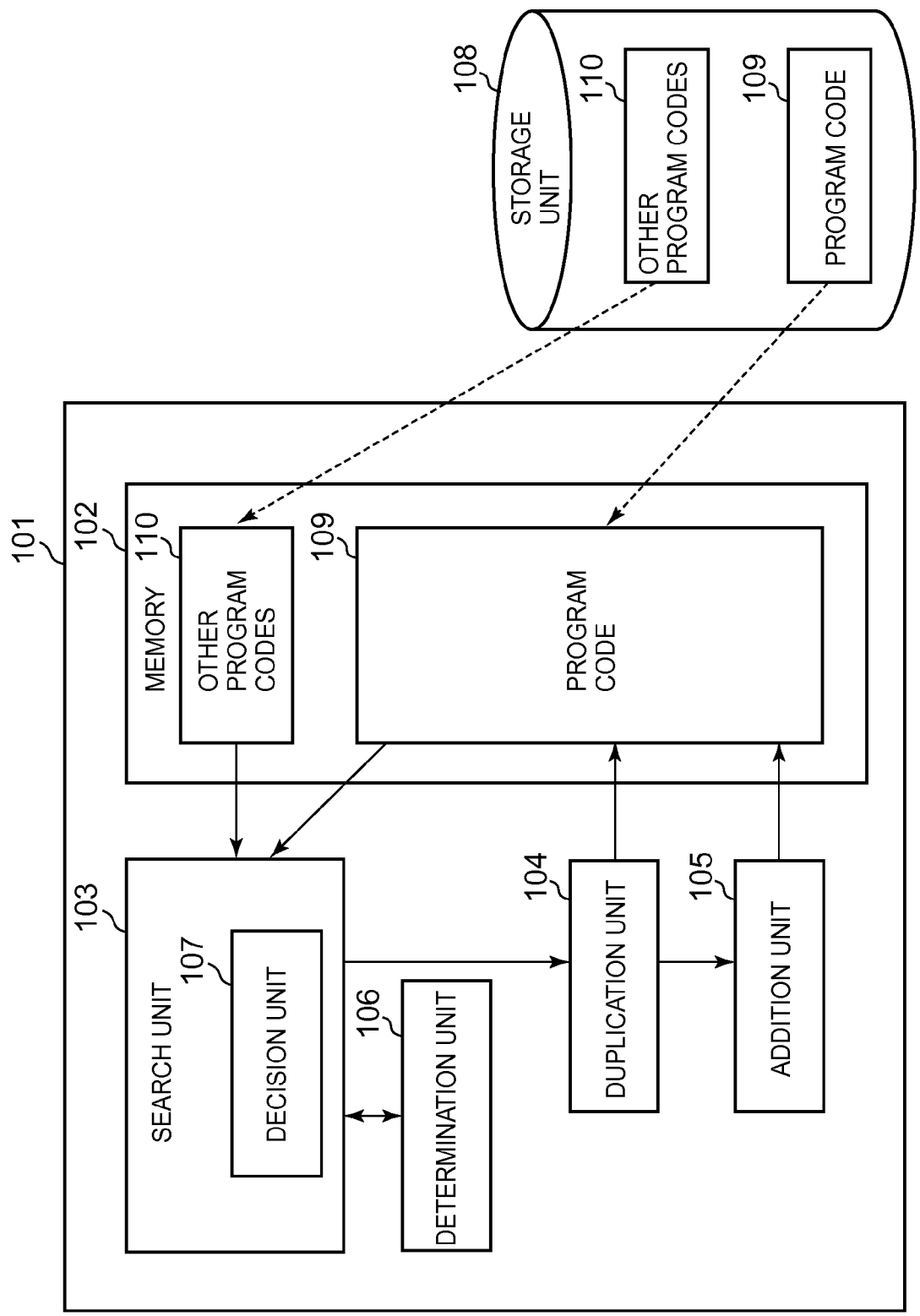
FIG. 1 is a functional block diagram illustrating the functions of a system for converting a program code according to an embodiment of the present invention.

The present invention provides a method of converting a program code of a program running in a multi-thread to a program code causing fewer lock collisions. The method is used to cause a computer system to execute steps which include reading the program code into a memory and searching the readout program code for a first conditional statement making a branch to a path which is in a synchronized block and has no side effect on the synchronized block.

The term "no side effect" means that a value under processing by a statement in the synchronized block is unable to be referenced by a statement outside the synchronized block. The invention also duplicates the path having no side effect to which the branch is made by the searched first conditional statement into the outside of the synchronized block; and adds a second conditional statement into the program code in response to the duplication.

The second conditional statement is a conditional statement making a branch to the duplicated path having no side effect. When the branch is made to the path having no side effect by the above method, the first conditional statement in the synchronized block is not executed. Therefore, lock collisions are reduced. The above method is particularly effective for a case of one conditional statement and two branches.

The first conditional statement includes a first conditional expression. The first conditional expression is defined so as to cause a selection of a path based on a readout of a first variable, a constant, or a combination thereof. The scope of the first variable, however, is not limited to within a routine for invoking a subroutine including the first conditional statement.

The second conditional statement includes a second conditional expression which causes a selection of a path according to a result of the first conditional expression on the basis of a variable for storing the result of the first conditional expression.

The searching step includes the step of further searching the readout program code for an update statement, wherein the update statement exists in the synchronized block and updates the first variable. The adding step includes the step of further adding a statement including the variable for storing the result of the first conditional expression and the result of the first conditional expression assigned to the variable in a range from immediately after the searched update statement to a last statement in the synchronized block.

The searching step includes the step of further searching at least one of the readout program code and other program codes for an update statement, in which the update statement exists in any other synchronized block which is synchronized with the synchronized block and updates the first variable, and the adding step includes the step of further adding a statement including the variable for storing the result of the first conditional expression and the result of the first conditional expression assigned to the variable in the range from immediately after the searched update statement to the last statement in the any other synchronized block.

The adding step includes the step of further adding a statement which initializes the variable for storing the result of the first conditional expression by using a value by which the second conditional statement causes the execution of a path including the synchronized block or by using the result of the first conditional expression in a location before the statement in which the variable for storing the result of the first conditional expression is referenced for the first time.

A side effect is processing occurs whose execution result is not easily canceled. Another side effect can be the occurrence of processing of synchronization between threads, processing of assigning a value to an instance variable, processing of assigning a value to a class variable, processing of performing input/output operations, processing of invoking a native code, or processing of assigning a value to a number indicating the position of an array element.

When there are two or more first conditional expressions, the result of the two or more first conditional expressions is obtained by a combination of the two or more first conditional expressions.

When there are three or more paths selected by the first conditional expression, the variable for storing the result of the first conditional expression corresponds to each of the paths having no side effect among the three or more paths.

The variable for storing the result of the first conditional expression is a variable of data type for which atomicity is ensured.

The searching step includes the step of further searching at least one of the program code and other program codes for any other synchronized block which is synchronized with the synchronized block, and the duplicating step is executed in response to the end of the search.

The searching step includes the step of further searching for a statement which is included in at least one of the program code and other program codes and references the first variable from a statement outside the synchronized block, and the duplicating step is executed in response to the end of the search.

When the synchronized block includes a statement starting a thread, the searching step includes the step of further searching for a statement, which is executed in synchronization with the statement in the synchronized block, from statements which are included in at least one of the program code and other program codes and are executed on the thread, and the method causes the computer system to further execute the step of determining a path including the statement starting the thread to be a path having a side effect in response to the search for the statement executed in synchronization with the statement in the synchronized block.

When the synchronized block includes a statement starting a thread, the searching step further includes the step of requiring a user to decide whether the path including the statement starting the thread is a path having no side effect.

When the variable which is used to determine the execution sequence of threads where the synchronized block is executed is defined in the synchronized block, the searching step includes the step of further searching for a statement, which is included in at least one of the program code and other program codes and references the used variable from outside the synchronized block, and the method causes the computer system to further execute the step of determining a path including the used variable to be a path having a side effect in response to the search for the statement referencing the used variable.

When the variable, which is used to determine the execution sequence of threads where the synchronized block is executed, is defined in the synchronized block, the searching step further includes the step of requiring the user to decide whether the path including the used variable is a path having no side effect.

The adding step includes the step of further adding a statement, which declares the variable for storing the result of the first conditional expression, to the readout program code. In addition, when a shared variable is included in at least one of the program code and the other program codes and is accessed from the statement outside the synchronized block, the declaration includes a specification of inhibiting optimization of an access sequence in the memory and a specification of ensuring atomicity. The shared variable is included in the path having no side effect and is able to be accessed from a plurality of threads. When the shared variable is not accessed, the declaration includes a specification of ensuring atomicity.

The searching step further includes the step of allowing the user to decide whether there is any other synchronized block which is synchronized with the synchronized block. Further, the method causes the computer system to execute the duplicating step after the allowing step.

The searching step includes the step of allowing the user to decide whether there is a statement referencing the first variable. The method causes the computer system to execute the duplicating step after the allowing step.

When the variable included in the second conditional expression is a variable for which inhibiting optimization is specified regarding the access sequence in the memory, a statement assigning the result of the first conditional expression is added to a location immediately before the last statement in the synchronized block in the step of further adding the statement assigning the result of the first conditional expression.

The computer system includes a search unit for reading the program code into a memory and searching the readout program code for a first conditional statement making a branch to a path, which is in a synchronized block and has no side effect on the synchronized block, a duplicating unit for duplicating the path having no side effect to which the branch is made by the searched first conditional statement into the outside of the synchronized block, and an addition unit for adding a second conditional statement into the program code in response to the duplication, wherein the second conditional statement is a conditional statement making a branch to the duplicated path having no side effect.

The search unit further searches the readout program code for an update statement, wherein the update statement exists in the synchronized block and updates the first variable. The addition unit further adds a statement including the variable for storing the result of the first conditional expression and the result of the first conditional expression assigned to the variable in a range from immediately after the searched update statement to the last statement in the synchronized block.

The search unit further searches at least one of the readout program code and other program codes for an update statement, in which the update statement exists in any other synchronized block which is synchronized with the synchronized block and updates the first variable. The addition unit further adds a statement including the variable for storing the result of the first conditional expression and the result of the first conditional expression assigned to the variable in a range from immediately after the searched update statement to the last statement in the any other synchronized block.

The addition unit further adds a statement which initializes the variable for storing the result of the first conditional expression by using a value by which the second conditional statement causes the execution of a path including the synchronized block or by using the result of the first conditional expression in a location before the statement in which the variable for storing the result of the first conditional expression is referenced for the first time.

The search unit searches at least one of the program code and other program codes for any other synchronized block which is synchronized with the synchronized block.

The search unit also searches for a statement which is included in at least one of the program code and other program codes and references the first variable from a statement outside the synchronized block.

When the synchronized block includes a statement starting a thread, the search unit further searches for a statement, which is executed in synchronization with the statement in the synchronized block, from a statement which is included in at least one of the program code and other program codes and describes implementation of the thread.

The computer system further includes a determination unit for determining a path including the statement starting the thread to be a path having a side effect in response to the search for the statement executed in synchronization with the statement in the synchronized block.

When the synchronized block includes a statement starting a thread, the search unit further includes a decision unit for allowing a user to decide whether the path including the statement starting the thread is a path having no side effect.

When the variable which is used to determine the execution sequence of threads where the synchronized block is executed is defined in the synchronized block, the search unit further searches for a statement, which is included in at least one of the program code and other program codes and references the used variable from outside the synchronized block.

The computer system further includes a determination unit for determining a path including the used variable to be a path having a side effect in response to the search for the statement referencing the used variable.

When the variable which is used to determine the execution sequence of threads where the synchronized block is executed is defined in the synchronized block, the search unit further includes a decision unit for allowing the user to decide whether the path including the used variable is a path having no side effect.

The addition unit further adds a statement, which declares the variable for storing the result of the first conditional expression, to the readout program code. When a shared variable is included in at least one of the program code and the other program codes and is accessed from the statement outside the synchronized block, the declaration includes a specification of inhibiting optimization of an access sequence in the memory and a specification of ensuring atomicity, wherein the shared variable is included in the path having no side effect and is able to be accessed from a plurality of threads. When the shared variable is not accessed, the declaration includes a specification of ensuring atomicity.

The search unit further includes a decision unit for allowing the user to decide whether there is any other synchronized block which is synchronized with the synchronized block.

The search unit further includes a decision unit for allowing the user to decide whether there is a statement referencing the first variable.

In the embodiments of the present invention, the term "the program code of a program running in multi-thread" means a source code of a program capable of performing a plurality of processes in parallel by generating a plurality of transactions called threads and allocating CPU time to each of the generated threads. The source code can be described by using, Java™ language or C++ language.

In the embodiments of the present invention, the term "lock" means that when processing is executed in one thread, the foregoing processing itself and processing related thereto are inhibited from being executed in other threads. For example, if processing which is a target of the lock is started in a first thread, the foregoing processing and processing related thereto are not executed in a second thread. The foregoing processing and processing related thereto in the second thread are placed in a standby state until the processing in the first thread is complete and then executed after the completion of the processing.

In the embodiments of the present invention, the term "lock collision" means a state where processing executed in one thread is a target of the lock and therefore the foregoing processing to be executed in any other thread and processing related thereto are placed in a waiting state until the processing executed in the first thread is complete. Moreover, the term "causing fewer lock collisions" means that a lock collision occurs only at a low frequency and that the time of the waiting state caused by the lock collision is short. A program code converted according to the embodiment of the present invention causes fewer lock collisions in comparison with the program code before the conversion.

The term "synchronized block" means a statement in a program code describing the processing which is the target of the lock. The statement in the program code is composed of an initial statement of the synchronized block, a last statement in the synchronized block, and a statement between the initial statement and the last statement.

The initial statement of the synchronized block can be a statement describing a synchronized declaration or a statement describing a method name modified by a synchronized modifier if the program code is described in Java™ language.

Similarly, the last statement in the synchronized block is "}" which represents an end position of the initial statement if the program code is described in the Java™ language.

If a subroutine invocation is included in the statement between the initial statement and the last statement (in other words, within the synchronized block), the statement describing an implementation of the subroutine may be included in the synchronized block. If the subroutine invocation is hierarchical such that the statement describing the implementation of the subroutine includes an invocation of another subroutine, the above synchronized block may further include a statement describing the implementation of all the subroutines. Here, the subroutine is a method.

The term "any other synchronized block synchronized with the synchronized block" means a synchronized block having a common variable accessed by processing which is a target of a lock or having a common specified locked object. Here, the locked object is a variable specified in the synchronized declaration in Java™ language. For example, if the locked object "lock" is specified in a synchronized declaration which declares a first synchronized block and the locked object "lock" is specified in a synchronized declaration which declares a second synchronized block, the second synchronized block is any other synchronized block synchronized with the first synchronized block. Moreover, if the first synchronized block is a method and "this" which indicates the above method is specified in the synchronized declaration which declares the second synchronized block, the second synchronized block is the any other synchronized block synchronized with the first synchronized block.

The term "side effect on the synchronized block" means processing (processing A), which is made by a statement in the synchronized block, whose result is likely to be referenced by processing (processing B) by a statement outside the synchronized block. In addition, the side effect on the synchronized block is processing whose result is not easily canceled. The side effect on the synchronized block is, for example, processing in any other synchronized block described in the synchronized block, processing of assigning a value to an instance variable, processing of assigning a value to a class variable, processing of performing input/output operations, processing of invoking processing included in a native code, or processing of assigning a value to a number indicating the position of an array element, but not limited thereto. The above side effect is determined by a computer system which references a statement on the processing registered with the list by a user.

The input/output operations are input/output operations to or from a screen, a file, or a network, but are not limited thereto. Moreover, the native code is a program described in a machine language. The native code is, for example, a compiled program. The processing included in the native code is invoked by, for example, Java Native Interface (JNI).

The term "no side effect on the synchronized block" means that a value under processing by a statement in the synchronized block is unable to be referenced by a statement outside the synchronized block.

The term "no side effect" means that there is no processing causing a side effect such as, for example, processing in any other synchronized block described in a synchronized block, processing of assigning a value to an instance variable, processing of assigning a value to a class variable, processing of performing input/output operations, processing of invoking processing included in a native code, or processing of assigning a value to a number indicating the position of an array element.

The term "path" means a series of statements in a program code corresponding to processing executed during run time of the program. The number of the statements may be zero.

The term "a path having no side effect on the synchronized block" means the series of statements corresponding to the processing having no side effect on the synchronized block during run time of the program.

The term "conditional statement" is a statement described in a program code for implementing a branch of processing in a program. The conditional statement includes a conditional expression. The conditional statement may include symbols indicating a range of a selected path. If the program code is described in, for example, Java™ language, the symbols are, for example "{" and "}". The conditional statement selects an executed path in accordance with a result of the conditional expression. If the program code is described in, for example, Java™ language, the conditional statement is, for example, an if statement or a switch statement.

The term "conditional expression" means an expression used to select a path. The conditional expression includes at least one of a variable, a constant, and an operator. If the conditional statement is, for example, an if statement "if(x==0){y=1;}," the conditional expression is "(x==0)." Moreover, if the conditional statement is a switch statement or a select case statement, a conditional expression is assumed to be an expression for comparing a case value related to both statements with a variable in which the value is stored. If the conditional statement is, for example, a switch statement "switch(x){case 1:y=1;break;}," the conditional expression is "(x==1)."

The number of conditional expressions is not limited to a one for one conditional statement. For example;

(1) If the conditional statement is the following if statement:

"if(x==0){y=0;}else if(x==1){y=1;}else{y=2;}"

then at least one of "(x==0)," "(x==1)," and "others" can be conditional expressions. Moreover, a new conditional expression may be generated with a combination of selected two or more of a plurality of conditional expressions such as, for example, "(x==0)," "(x==1)," and "others." Here, the combination means to perform, for example, logical operations based on the above conditional expressions.

(2) If conditional statement is the following switch statement:

"switch(x){
case 1: y=1; break;
case 2: y=2; break;
default: y=3; break;
}"

then at least one of "(x==1)," "(x==2)," and "others" can be conditional expressions. Moreover, a new conditional expression may be generated with a combination of selected two or more of a plurality of conditional expressions such as, for example, "(x==1)," "(x==2)," and "others."

The term "first variable" means a variable for causing a first conditional expression to select a path. The "first variable" is, for example, at most a single variable. If the program code is described in, for example, Java™ language, the first variable is one instance variable or one class variable.

The term "a result of a first conditional expression" means a value represented by a first conditional expression or by a combination of a plurality of first conditional expressions.

(1) If the conditional statement is an "if" statement, a result of the first conditional expression is expressed by truth or falsity. The truth or falsity may be represented by a value tailored to the specification of the above conditional expression in the language in which the program code is described or may be represented by a value determined by a user. For example, a value representing truth may be "true" and a value representing falsity may be "false," or a value representing truth may be "0" and a value representing falsity may be "−1." If the value representing the above truth or falsity is "true" or "false," a variable for storing the result of the first conditional expression is of boolean type. If the value representing the above truth or falsity is "0" or "−1," a variable for storing the result of the first conditional expression is, for example, of numeric type supporting negative values. Moreover, if there are a plurality of first conditional expressions in the if statement because the if statement includes, for example an elseif clause, the result of the first conditional expressions may be obtained with a combination of values represented by the plurality of first conditional expressions. The foregoing combination performs logical operations on the values representing the conditional expressions.

(2) If the conditional statement is a switch statement, a result of the first conditional expression is expressed by a value indicating that the variable specified in the switch statement is a value specified by a case clause (hereinafter, the value is referred to as "indicating value") or a value corresponding to the indicating value. The indicating value may be the value specified by the case clause. The corresponding value is a value determined by the user. The user uses a serial number for the corresponding value. If the indicating value is the result of the first conditional expression, the variable for storing the result of the first conditional expression is of data type similar to the specified variable. Moreover, the result of the first conditional expression may be obtained with the combination of a plurality of the indicating values or a plurality of the corresponding values. The combination performs grouping according to a range of the indicating values or the corresponding values.

The term "a variable of data type for which atomicity is ensured" means a variable of data type which is read into a memory by one-time operation and whose execution of reading is ensured by the specification of the language used for describing the program code.

If the language is, for example, Java language and the above program code is executed in the OS of 32 bits or more, for example, a boolean type, a byte type, a short type, an "int" type, or a "float" type is the data type for which atomicity is ensured.

The term "any other program code" means a program code linked from the program code before the conversion. The term "linked" means, for example, "invoked" or "to share a variable," but not limited thereto. Further, the any other program code is able to be analyzed according to the embodiment of the present invention. The any other program code is, for example, a source code or a byte code.

The term "inhibiting optimization of an access sequence in the memory" means inhibiting compiler optimization of an access sequence in the memory when the program code before the conversion is compiled. The specification for inhibiting the optimization is performed by modifying a variable with a modifier "volatile" if the program code before the conversion is described in Java™ language.

Hereinafter, the embodiment of the present invention will be described with reference to accompanying drawings. It is to be understood that this embodiment is merely illustrative of the preferred embodiment of the present invention, but is not intended to limit the scope of the invention. Unless otherwise specified in the following figures, the same reference numerals are used to refer to the same components.

Referring to FIG. 1, there is shown a functional block diagram illustrating the functions of a system for converting a program code according to the embodiment of the present invention.

A computer system (101) includes a memory (102), a search unit (103), a duplicating unit (104), an addition unit (105), a determination unit (106), and a decision unit (107). In addition, a storage unit (108) may be included in the computer system (101) or be included in a different system.

The computer system (101) reads a program code (109) before the conversion from the storage unit (108) into the memory (102). Here, the computer system (101) may further read any other program code (110) from the storage unit (108) into the memory.

The search unit (103) searches for the program code (109) read into the memory and optionally searches for the any other program code (110). In the search processing, the search unit (103) searches for a first conditional statement in a synchronized block, an update statement, any other synchronized block synchronized with the synchronized block, a statement referencing a first variable from a statement outside the synchronized block, a statement describing the implementation of any other thread executed in synchronization with a statement in the synchronized block starting a thread, or a statement referencing a variable used to determine the execution sequence of the threads. The scope of the first variable is not limited to within a routine including the first conditional statement The search unit (103) includes a decision unit (107).

If information for performing the search is insufficient, the decision unit (107) allows a user to input the information. In addition, the decision unit (107) allows the user to input conditions of the search in order to narrow down the conditions of the search.

The determination unit (106) receives a search result from the search unit (103). The determination unit (106) determines a path having no side effect in the program code (109) based on the search result.

The duplicating unit (104) duplicates the determined path having no side effect into the outside of the synchronized block of the program code (109).

The addition unit (105) adds a second conditional statement to be branched to the duplicated path having no side effect to the program code (109) read into the memory. Moreover, the addition unit (105) adds a statement including a variable for storing a result of a first conditional expression and a result of the first conditional expression assigned to the variable, a statement initializing the variable, or a statement declaring the variable to the program code (109) read into the memory.

Figure 2:
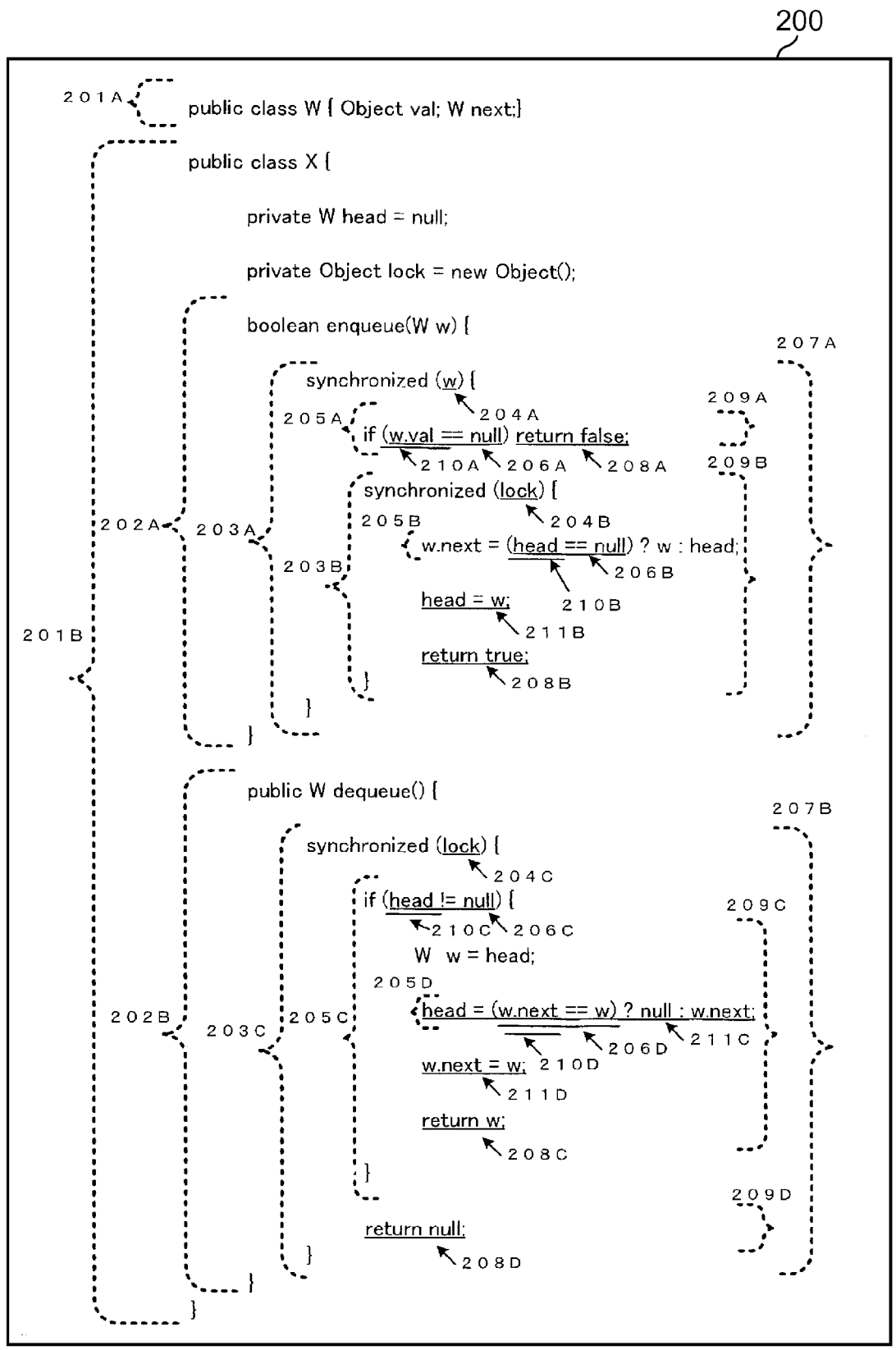
FIG. 2 is a diagram illustrating an example of a program code before the conversion shown in FIG. 1 according to the embodiment of the present invention.

Referring to FIG. 2, there is shown an example of a program code before the conversion shown in FIG. 1 according to the embodiment of the present invention.

A program code (200) is a program code before the conversion. The following describes respective terms described in this specification, taking the program code (200) as an example.

A statement corresponding to a class satisfies the format "class Class name {Class implementation}." Therefore, in the program code (200) before the conversion, the statements corresponding to the "class" are class W (201A) and class X (201B).

A statement corresponding to a method satisfies the format "Return value Method name (Argument type Argument name) {Method implementation}." Therefore, the statements corresponding to the "method" in the program code (200) before the conversion are a method enqueue(W w) (202A) and a method dequeue( ) (202B). Moreover, if the statement described in the method includes a different method invocation, a statement describing the different method invocation is also treated as a statement described in the synchronous method.

A statement corresponding to a synchronized block is, for example, a statement declaring a "synchronized" block or a method with a "synchronized" modifier specified. Therefore, the statements corresponding to the "synchronized block" in the program code (200) before the conversion are a first synchronized block (203A), a second synchronized block (203B), and a third synchronized block (203C).

A locked object of the synchronized block is, for example, a variable specified by the declaration of the "synchronized" block or by an argument of the method with the "synchronized" modifier specified. Therefore, the locked object of the first synchronized block (203A) is w (204A). The locked object of the second synchronized block (203B) is "lock" (204B). The locked object of the third synchronized block (203C) is "lock" (204C).

Moreover, if the statement described in the synchronized block includes a method invocation, a statement describing the implementation of the method is also treated as a statement described in the synchronized block.

A statement corresponding to a conditional statement is, for example, a statement describing, for example, an "IF" statement, a "SWITCH" statement, or a "tertiary operator." Therefore, the statements corresponding to the "conditional statement" in the program code (200) before the conversion are a first conditional statement (205A), a second conditional statement (205B), a third conditional statement (205C), and a fourth conditional statement (205D).

A conditional expression is included in a conditional branch statement and used to select an execution path. Therefore, the conditional expression of the first conditional statement (205A) is w.val==null (206A). The conditional expression of the second conditional statement (205B) is head==null (206B). The conditional expression of the third conditional statement (205C) is head!==null (206C). The conditional expression of the fourth conditional statement (205D) is w.next==w (206D).

A statement corresponding to a path is, for example, a statement likely to be processed when the program code (200) is executed. For example, a path from the start of execution of the method enqueue(W w) (202A) to the end thereof is a path (207A), and a path from the start of execution of the method dequeue( ) (202B) to the end thereof is a path (207B).

In addition, a path from the start of execution of the conditional statement to the end thereof ranges from the statement at which each branch processing is started to the statement at which each branch processing is completed.

(1) The first conditional statement (205A) completes each branch processing in a statement subsequent to the processing (208A and 208B) of exiting from the method enqueue(W w). Therefore, paths from the start of execution of the first conditional statement (205A) to the end thereof are a path (209A) executed if the conditional expression (206A) is satisfied and a path (209B) executed unless the conditional expression (206A) is satisfied.

(2) The second conditional statement (205B) has the same meaning as "if(head==null){w.next=w;}else{w.next=head;}." Therefore, each branch processing ends in a statement subsequent to the processing of assigning "w" or "head" to "w.next." Accordingly, paths from the start of execution of the second conditional statement (205B) to the end thereof are "w.next=W;" which is a path executed if the conditional statement (206B) is satisfied and "w.next=head;" which is a path executed unless the conditional statement (206B) is satisfied.

(3) In the third conditional statement (205C), each branch processing ends in a statement subsequent to the processing of exiting from the method dequeue( ) (202B) (208C and 208D). Therefore, paths from the start of execution of the third conditional statement (205C) to the end thereof are a path (209C) executed if the conditional statement (206C) is satisfied and a path (209D) executed unless the conditional statement (206C) is satisfied.

(4) The fourth conditional statement (205D) has the same meaning as "if(w.next==w){head=null;}else{head=w.next;}." Therefore, each branch processing ends in a statement subsequent to the processing of assigning "null" or "w.next" to "head." Therefore, paths from the start of execution of the fourth conditional statement (205D) to the end thereof are "head=null" which is a path executed if the conditional statement (206D) is satisfied and "head=w.next;" which is a path executed unless the conditional statement (206D) is satisfied.

The first variable is used to decide a branch. Therefore, a first variable in the first conditional statement (205A) is w.val (210A). A first variable in the second conditional statement (205B) is head (210B). A first variable in the third conditional statement (205C) is head (210C). A first variable in the fourth conditional statement (205D) is w.next (210D).

The update statement exists in the synchronized block including the first variable and updates the first variable. An update statement updating w.val (210A) is not included in the first synchronized block (203A) including w.val (210A). An update statement updating head (210B) is an update statement (211B). An update statement updating head (210C) is an update statement (211C). An update statement updating w.next (210D) is an update statement (211D).

Figure 3A:
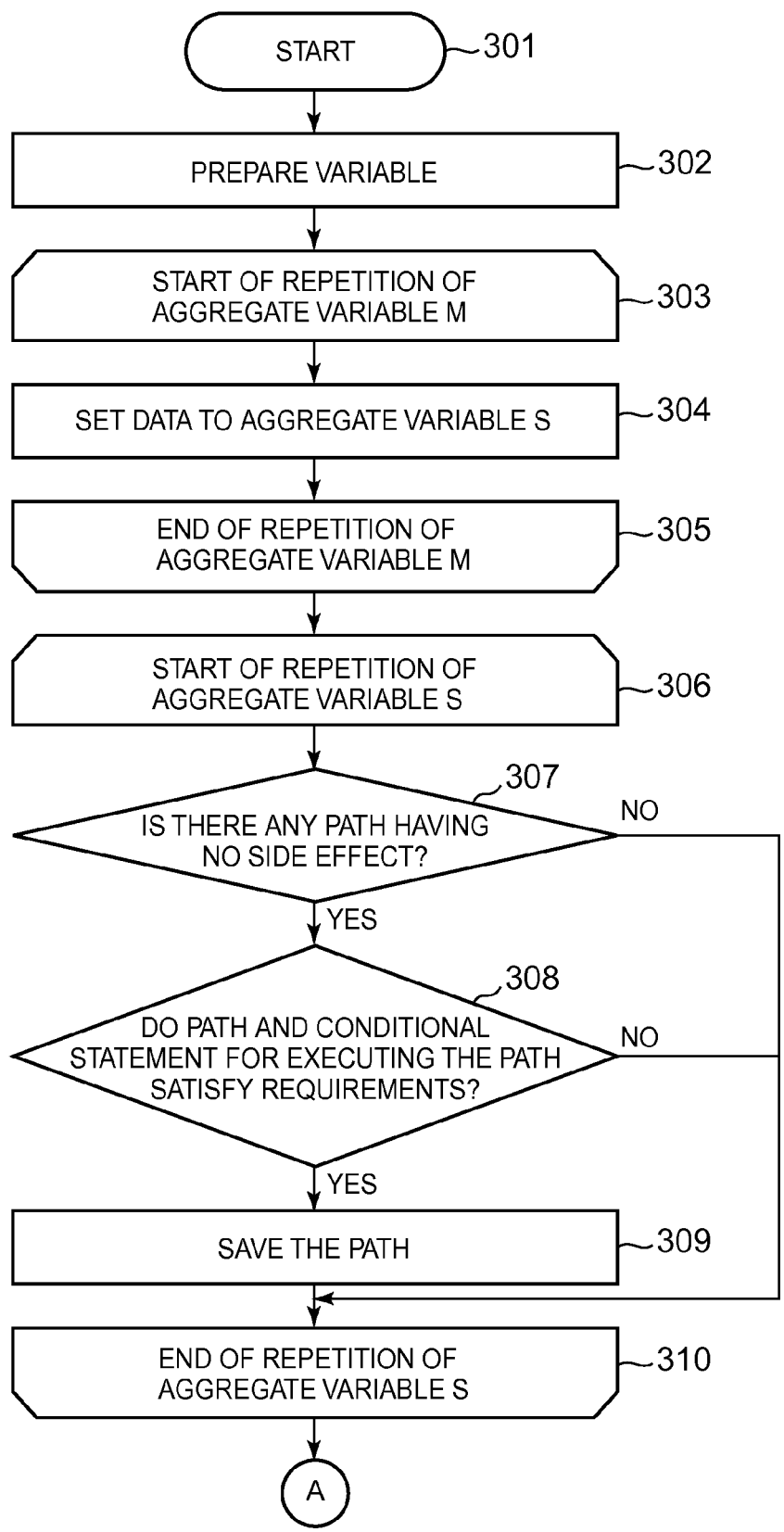
FIG. 3A is a diagram illustrating an example of processing steps for acquiring information necessary for the conversion among processing steps executed in the conversion program shown in FIG. 1 according to the embodiment of the present invention.
Figure 3B:
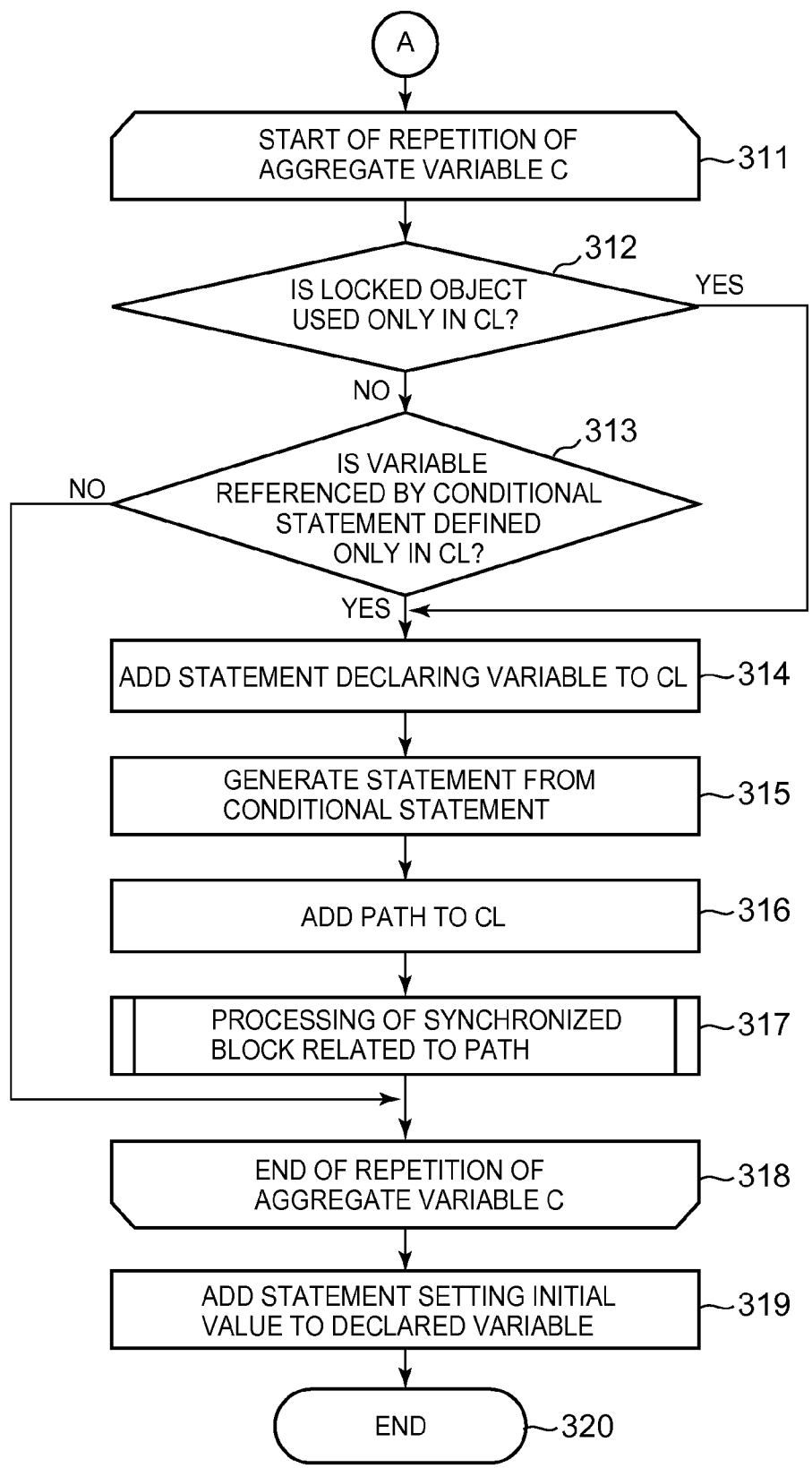
FIG. 3B is a diagram illustrating an example of processing steps for performing the conversion among the processing steps executed in the conversion program shown in FIG. 1 according to the embodiment of the present invention.
Figure 3C:
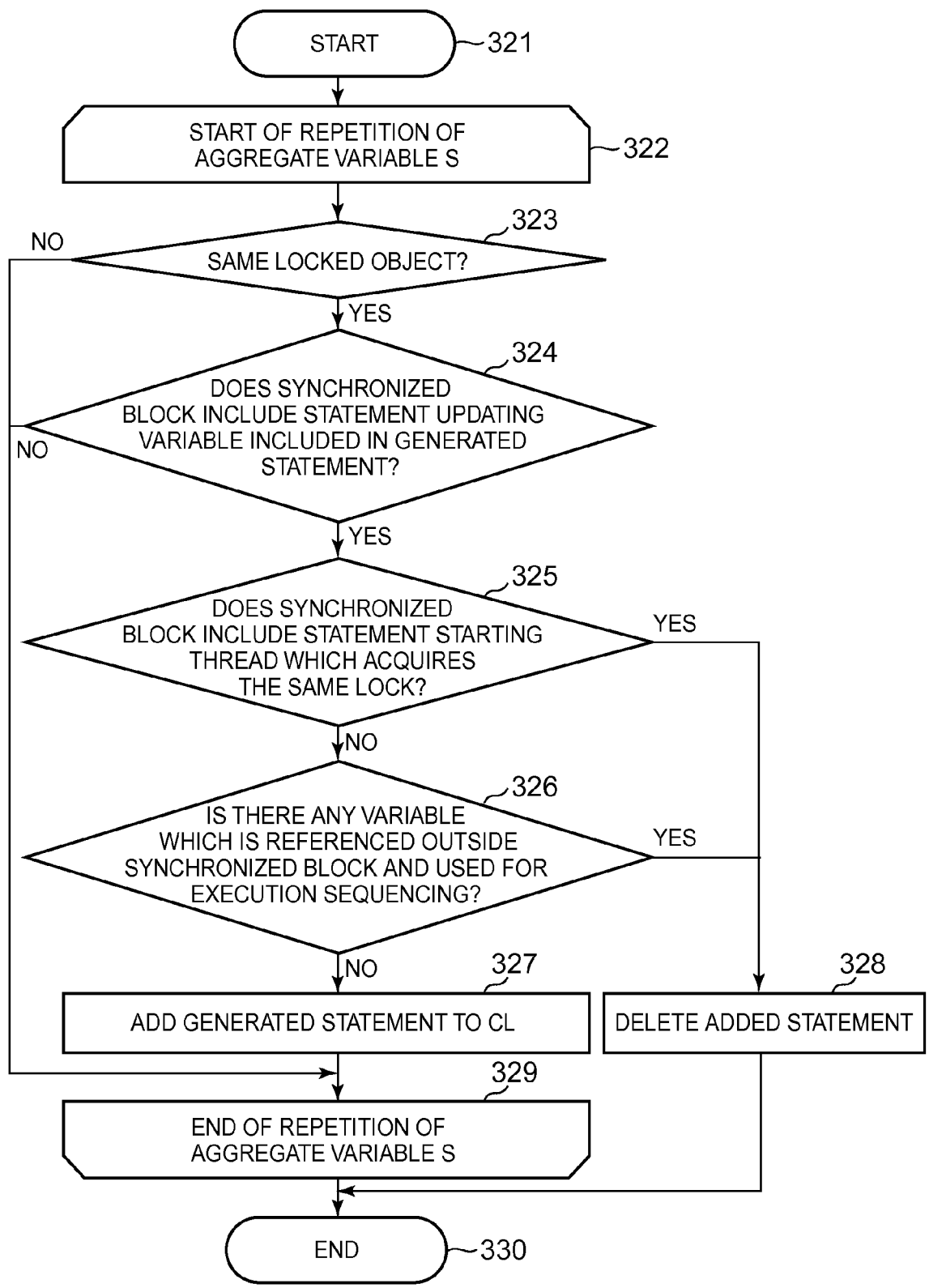
FIG. 3C is a diagram illustrating the details of the processing of step 317 shown in FIG. 3B according to the embodiment of the present invention.

FIGS. 3A to 3C show an example of processing steps executed in the conversion program shown in FIG. 1 according to the embodiment of the present invention.

The following description will be made taking as an example a case where the program code before the conversion is described in Java™ language.

The computer system (101) receives a program code before the conversion (hereinafter, referred to as CL) as input data. The computer system may further receive a different program code (hereinafter, referred to as the different CL) linked from the foregoing CL in addition to the foregoing CL as input data. Here, the input data is data which is able to be referenced from the foregoing conversion program.

FIG. 3A shows an example of processing steps for acquiring information necessary for the conversion among processing steps executed in the conversion program shown in FIG. 1 according to the embodiment of the present invention.

Step 301 represents the start of the conversion processing. In step 301, the computer system reads the input data into, for example, a memory. In response to the end of the reading, the processing proceeds to step 302.

In step 302, the computer system prepares a variable i, an aggregate variable M, an aggregate variable S, and an aggregate variable C for use in storing the information for the conversion.

The variable i is a variable in which a value for identifying a variable (hereinafter, referred to as the second variable) declared in step 315 described below is stored. The variable i is used for, for example, a serial number given to the second variable. The preparation of the variable i may be omitted. Unless the variable i is prepared, the computer system gives a uniquely-identifiable variable name to the second variable every time the second variable is declared. The uniquely-identifiable variable names may be determined by, for example, a user or may be determined randomly so that there is no overlap in the variable names.

The aggregate variable is a group for use in treating data having different meanings. The aggregate variable is represented by, for example, an array or a structure.

The aggregate variable M is an aggregate variable in which information on a method, which processing is likely to reach when the above CL is executed, is stored for each method. The information on the method is only required to be information by which a statement describing the implementation of the corresponding method is identifiable from the program code. The information on the method is, for example, the start position of the statement describing the implementation of the method, the end position of the statement describing the implementation of the method, or the statement describing the implementation of the method, but not limited thereto.

The aggregate variable S is an aggregate variable to which information on a synchronized block, which processing is likely to reach when each of the methods is executed, is set for each synchronized block. The information on the synchronized block includes a locked object of the synchronized block (hereinafter, referred to as the first information of S), the start/end position in the program code of the synchronized block (hereinafter, referred to as the second information of S), and a statement in the synchronized block (hereinafter, referred to as the third information of S).

The aggregate variable C is an aggregate variable to which information on an execution path, which satisfies a predetermined condition included in each of the synchronized blocks, is set for each execution path. The information on the execution path includes a locked object of the synchronized block corresponding to the execution path (hereinafter, referred to as the first information of C), the start/end position in the program code of the synchronized block corresponding to the execution path (hereinafter, referred to as the second information of C), and information by which the execution path is identifiable from the program code (hereinafter, referred to as the third information of C). The third information of C is, for example, the start position of the execution path, the end position of the execution path, or the statement describing the execution path, but not limited thereto.

The computer system sets initial values to the variable i, the aggregate variable S, and the aggregate variable C in the above preparation of the variable i, the aggregate variable S, and the aggregate variable C. The initial values are, for example, values representing empty. The computer system sets, for example, 0 or 1 as an initial value of the variable i. Moreover, if the aggregate variables S and C are, for example, structures including a numeric type variable and a character type variable, the computer system sets 0 as the initial value of the numeric type variable and NULL as the initial value of the character type variable as the initial values of the aggregate variables S and C.

The computer system further sets information on the method to the aggregate variable M in the preparation of the aggregate variable M. The computer system searches for methods included in the CL and sets information on the methods found by the search to the aggregate variable M. In the search, the target method may be previously specified by the user or all methods included in the CL may be searched for. A method which processing is likely to reach by the execution of the method included in the CL may be searched from, for example, the foregoing different CL. Moreover, instead of the above search, the user may set the information on the method to the aggregate variable M.

In response to the end of the preparation, the processing proceeds to step 303.

Step 303 represents the start of repetition of the aggregate variable M.

In step 303, the computer system retrieves a piece of information on the method (hereinafter, referred to as m) from the aggregate variable M. In response to the end of the retrieval, the processing proceeds to step 304.

In step 304, the computer system sets data to aggregate variable S.

The computer system searches for a synchronized block which processing is likely to reach when the method corresponding to the retrieved m is executed. If the method itself is the synchronized block, the method itself is also the synchronized block to be searched for. If the CL is a program code described in Java™ language, the computer system searches for "synchronized" from the above CL. If the method corresponding to m is modified by "synchronized," the modifier "synchronized" is also "synchronized" to be searched for.

The computer system acquires the locked object (the first information of S), the start/end position in the program code (the second information of S), and the statement in the synchronized block (the third information of S) for each of the synchronized blocks searched for from the foregoing synchronized blocks, and then sets the acquired first to third information of S as a set of information to the aggregate variable S for each synchronized block. The above setting is unnecessary with respect to a synchronized block, which has already been searched for and for which information has been set, among the synchronized blocks searched for. In response to the end of the above setting, the processing proceeds to step 305.

Step 305 represents the end of repetition of the aggregate variable M.

If all pieces of information m have already been retrieved, the processing proceeds to step 306. If there is any piece of information m not having been retrieved yet, the processing returns to step 303.

Step 306 represents the start of repetition of the aggregate variable S.

In step 306, the computer system retrieves the above one set of information on the synchronized block (hereinafter, referred to as s) from the aggregate variable S. In response to the end of the retrieval, the processing proceeds to step 307.

In step 307, the computer system determines whether a path causing no side effect is included in the statement in the synchronized block set to the aggregate variable S corresponding to the retrieved s (hereinafter, referred to as the third information of s). The determination is performed for all of the paths, which are included in the statement in the synchronized block (the third information of s) and are related to routings to be executed (hereinafter, the paths are referred to as execution paths). In the determination, the computer system determines whether, for example, the above execution path includes the cause of the side effect described in a side effect list described below.

For example, the side effect list is previously generated by the user. The user previously registers the cause of the side effect such as a method or a variable in the side effect list. The method is an I/O-related method or a JNI method. The variable is an instance variable or a class variable. In the above determination, the computer system determines that the execution path causes a side effect if the above method or variable is found in the execution path and determines that the execution path does not cause a side effect unless the above method or variable is found. The registration may be automatically executed by the computer system. The computer system is able to acquire the cause of the side effect from at least one of the above CL and the different CL in step 302 and to register the acquired cause of the side effect in the side effect list.

Moreover, the computer system is able to perform the above determination by checking the types of the variables included in the execution path. The computer system is able to perform the above determination by checking where a declaration of the variable is described in the CL or to which range in the CL the scope of the variable is set.

If the execution path includes a path causing no side effect, the processing proceeds to step 308. If all of the execution paths cause a side effect, the processing proceeds to step 310.

In step 308, the computer system determines whether the execution path causing no side effect and the conditional statement for causing the execution of the execution path satisfy the following requirements: the execution path includes readout of at most one of the instance variable and the class variable; and the conditional statement evaluates the readout and the constant.

If even one conditional statement satisfying the requirement exists, the processing proceeds to step 309. If no conditional statement satisfying the requirement exists, the processing proceeds to step 310.

In step 309, the computer system sets a locked object which is the first information of S (the first information of C), the start/end position in the program code which is the second information of S (the second information of C), and information by which the execution path executed by the conditional statement satisfying the above requirement is identifiable from the program code (the third information of C) as a set of information to the aggregate variable C, with respect to each path executed by the conditional statement satisfying the above requirement.

In response to the end of the setting, the processing proceeds to step 310.

Step 310 represents the end of repetition of the aggregate variable S.

If all sets of information s have already been retrieved, the processing proceeds to step 311. If there is any set of information s which has not been retrieved yet, the processing returns to step 306.

FIG. 3B shows an example of processing steps for performing the conversion among the processing steps executed in the conversion program shown in FIG. 1 according to the embodiment of the present invention.

Step 311 represents the start of repetition of the aggregate variable C.

In step 311, the computer system retrieves a set of information on the execution path (hereinafter, referred to as c) from the aggregate variable C. The computer system performs the above retrieval sequentially from the information on the execution path executed earliest in the program code. In response to the end of the retrieval, the processing proceeds to step 312.

In step 312, the computer system determines whether the locked object (hereinafter, referred to as the first information of c) set to the aggregate variable C corresponding to the retrieved c is used only within the CL. In the determination, for example, if the CL is described in Java™ language, it is checked that the private modifier is used for the definition of the locked object (the first information of c) or that the different CL does not include the description of using the locked object (the first information of c). If the private modifier is used for the definition of the locked object (the first information of c) or the different CL does not include the description of using the locked object (the first information of c) as a result of the check, the computer system determines that the locked object (the first information of c) is used only within the CL. In this regard, the above check is unable to be performed in some cases for the reason that the different CL is not given as input data or that the different CL is provided as binary data and therefore the description of the source code is unknown. If the above check is unable to be performed, the computer system may determine that the locked object (the first information of c) is not used only within the CL. Moreover, the computer system may cause the user to make the above determination by displaying a message for use in causing the user to make the determination on the monitor. If the locked object is used only within the CL, the processing proceeds to step 314. If the locked object is used also outside the CL, the processing proceeds to step 313.

In step 313, the computer system determines whether all of the variables included in the conditional statement causing the execution of the path corresponding to the third information of the aggregate variable C corresponding to the above c (hereinafter, referred to as the third information of c) are defined only within the CL. In the determination, it is checked that the different CL does not include the definition of the referenced variable. Unless the different CL includes the definition of the referenced variable as a result of the check, the computer system determines that the referenced variable is defined only within the CL. In this regard, the above check is unable to be performed in some cases, for example, for the reason that the different CL is not given as input data or that the different CL is provided as binary data and therefore the description of the source code is unknown.

If the above check is unable to be performed, the computer system may determine that the referenced variable is not defined only within the CL. Moreover, the computer system may cause the user to make the above determination by displaying a message for use in causing the user to make the determination on the monitor. If the referenced variable is defined only within the CL, the processing proceeds to step 314. Unless the referenced variable is defined only within the CL, the processing proceeds to step 318.

In step 314, the computer system adds a statement declaring a variable (hereinafter, referred to as the second variable) into the CL. The location where the statement is added depends on the specification of the program language in which the CL is described. The declaration of the second variable declares the second variable of data type, for which atomicity is ensured and for which being static and inhibiting optimization are specifiable.

Here, the term "atomicity is ensured" means that the language specification ensures that the variable reading into the memory is performed by a one-time operation. If Java™ language is used, for example, the boolean type, the byte type, the short type, the int type, or the float type is a data type having a size of 32-bits or less. For example, if a program described in Java™ language is executed in the CPU of 32 bits or more, it is ensured that the variable reading into the memory is performed by one-time operation in the data type. The term "being static" means that the CL has only one entity. For example, in the case of Java™ language, a variable which is static is specifiable by a modifier "static." Moreover, the term "inhibiting optimization" means inhibiting the compiler from performing optimization of an access sequence in the memory when the program code is compiled. For example, in the case of Java™ language, inhibiting optimization of a variable is specifiable by a modifier volatile. The introduction of the volatile declaration ensures the visibility of the memory order and a change to the outside of the synchronized block.

Any variable name of the second variable may be used as long as the name does not overlap the names of other variables. The name may be identified by an inclusion of, for example, the variable i. If the CL is a program code described in a language in which an array is usable as a second variable, the above name may be an array with the variable i as a suffix.

The declaration of the second variable declares that the second variable is a static variable. Moreover, if a shared variable included in a path corresponding to the third information of c is accessed from other than statements in the synchronized block whose information is set to S, the declaration of the second variable further declares that the second variable is a target of inhibiting optimization. Here, the shared variable is likely to be accessed from a plurality of threads. If the program language in which the CL is described is Java™ language, the shared variable is an instance variable or a class variable. Whether the shared variable is accessed is determined by, for example, reviewing the CL or the different CL.

In this regard, the above review is unable to be executed in some cases, for example, for the reason that the different CL is not given as input data or that the different CL is provided as binary data and therefore the description of the source code is unknown. If the review is unable to be performed, the computer system may determine that the shared variable is accessed from the outside of the synchronized block. Further, the computer system may cause the user to make the above determination, for example, by displaying a message for use in causing the user to determine whether the shared variable is accessed from the outside of the synchronized block on the monitor.

In response to the end of the addition, the processing proceeds to step 315.

In step 315, the computer system generates a statement from the conditional statement causing the execution of the execution path corresponding to the third information of c.

The generated statement assigns a value, which is different between the case where the condition for executing the execution path is satisfied and the case where the condition is not satisfied, to the second variable.

For example, the second variable is a variable bl of boolean type and the conditional expression of the conditional statement is (x!=null), the generated statement is able to be "bl=(x!=null);)." In another example, if the second variable is a variable i1 of int type and the conditional expression of the conditional statement is (y==0), the generated statement is, for example, "if(y==0){i1=0;}else{i1=1;};."

Moreover, if the above conditional statement is, for example, a conditional statement branching to three or more paths "if(x==0){if(y==0){x++;y--;}else{c2++;}}else{c1++;}" (cl and c2 are both local variables)," the generated statement is able to be, for example, "b=(x!=0)?1:(y!=0)?2:0;." Here, the value assigned to the variable b indicates which is to be selected among the paths having no side effect. In the above example, there is generated a statement causing the selection of a path in which "c1++;" is executed if b is 1 or a path in which "c2++;" is executed if b is 2.

Subsequently, the computer system deletes the declaration of the static variable from the declaration of the second variable if the conditional expression includes an instance variable. For example, in the case of Java™ language, the deletion is to delete the modifier "static."

In response to the end of the above deletion, the processing proceeds to step 316.

In step 316, the computer system duplicates the path corresponding to the third information of c to a location immediately before the start position of the synchronized block in the CL indicated by the second information of c. Subsequently, the computer system starts the processing from the added execution path if the value of the second variable is for the satisfied condition, while adding a conditional statement starting the processing from the synchronized block in the CL if the value of the second variable is for the unsatisfied condition. The end of the conditional statement is adapted to be immediately after the end position of the synchronized block in the CL indicated by the second information of c in both cases where the value is for the satisfied condition and where the value is for the unsatisfied condition.

In response to the end of the addition of the conditional statement, the processing proceeds to step 317.

In step 317, the computer system performs processing of the synchronized block related to the execution path corresponding to the third information of c. The details of the processing will be described later with reference to FIG. 3C. In the processing of the synchronized block, a new statement is added to the CL. Moreover, in the processing of the synchronized block, the statements added in steps 314 and 316 can be deleted. In response to the end of the processing of the synchronized block the processing proceeds to step 318.

Step 318 represents the end of the repetition of the aggregate variable C.

If all sets of information c have already been retrieved, the processing proceeds to step 319. If there is any c which has not been retrieved yet, the processing returns to step 311.

In step 319, the computer system adds a statement setting an initial value to the second variable between the statement declaring the second variable and the statements added to the CL in steps 314 and 316 corresponding to the second variable or a statement which is a statement of the synchronized block corresponding to the second variable and executed earliest, with respect to the second variable. The statement setting the initial value is the statement generated in step 315. Here, the initial value may be the value for the unsatisfied condition. The addition of the foregoing statement is executed with respect to all the defined second variables.

In response to the end of the addition, the processing proceeds to step 320.

Step 320 represents the end of the conversion processing. FIG. 3C shows the details of the processing of step 317 shown in FIG. 3B according to the embodiment of the present invention.

Step 321 represents the start of the processing of step 317. In step 322, the computer system retrieves a piece of information (s) on the method from the aggregate variable S. In response to the end of the retrieval, the processing proceeds to step 323.

In step 323, the computer system determines whether the locked object which is the first information of c is the same as the locked object which is the first information of s. If both are the same, the processing proceeds to step 324. Otherwise, the processing proceeds to step 329.

In step 324, the computer system determines whether the synchronized block represented by the third information of s includes a statement updating the variable included in the statement generated in step 315. If the synchronized block includes the updating statement, the processing proceeds to step 325. Unless the synchronized block includes the updating statement, the processing proceeds to step 329.

In step 325, the computer system determines whether the synchronized block represented by the third information of s includes a statement starting a thread which acquires a lock by using the locked object which is the first information of c. The determination is performed by the computer system through reviewing the synchronized block. In the review, a statement (hereinafter, referred to as the first statement) causing the locked object to be used within the synchronized block is found in some cases. The first statement is, for example, a method which takes the locked object as an argument. If the first statement is found, the computer system obtains the execution path which is executed by the first statement by reviewing, for example, the different CL. The computer system is able to find the statement starting the thread by reviewing the obtained execution path.

If the statement starting the thread is not found as a result of the review, the processing proceeds to step 326. If the statement is found, the processing proceeds to step 328.

In this regard, the review is unable to be performed in some cases, for example, for the reason that the different CL is not given as input data or that the different CL is provided as binary data and therefore the description of the source code is unknown. If the above review is unable to be performed, the computer system may determine that, for example, the statement starting the thread is included in the execution path corresponding to the third information of c. Moreover, the computer system may cause the user to make the above determination, for example, by displaying a message, which causes the user to input whether the statement starting the thread is included, on the monitor.

In step 326, the computer system determines whether the variable defined in the synchronized block corresponding to the third information of s is referenced outside the synchronized block and used for execution sequencing among threads. The determination is performed by the computer system through reviewing the program code. If the variable is not found as a result of the review, the processing proceeds to step 327. If the variable is found, the processing proceeds to step 328.

In this regard, the review is unable to be performed in some cases, for example, for the reason that the different CL is not given as input data or that the different CL is provided as binary data and therefore the description of the source code is unknown. If the review is unable to be performed, the computer system may determine that, for example, the variable is included in the execution path corresponding to the third information of c. Moreover, the computer system may cause the user to make the above determination, for example, by displaying a message, which causes the user to input whether the variable is included, on the monitor.

In step 327, the computer system adds the statement generated in step 315 to the CL. Here, if the second variable is a variable for which inhibiting variable optimization is specified, the addition is performed with respect to the synchronized block corresponding to s. The position in the CL where the statement is added is immediately before the statement for exiting the synchronized block corresponding to s.

If the second variable is a variable for which inhibiting variable optimization is not specified, the position in the CL where the statement is added is after the updating statement found in step 324 and before the processing for exiting the synchronized block corresponding to s.

In response to the end of the addition, the processing proceeds to step 329.

In step 328, the computer system deletes the statements added to the CL in steps 314 and 316.

In response to the end of the deletion, the repetition of step 322 ends and the processing proceeds to step 330.

Step 329 represents the end of the repetition of the aggregate variable S.

If all sets of information s have already been retrieved, the computer system increments the variable i. In response to the end of the increment, the processing proceeds to step 330. If there is any set of information s which has not been retrieved yet, the processing returns to step 322.

Step 330 represents the end of the processing of step 317.

Concrete examples of the operations of steps in FIGS. 3A to 3C are shown in FIGS. 4A to 4C and FIGS. 5A to 5C.

FIG. 4A shows input data CL for use in concretely describing the operations of steps shown in FIGS. 3A to 3C according to the embodiment of the present invention.

The example shown in FIGS. 4A to 4C illustrates a case of performing an interaction with the user in step and step 326.

The computer program starts up the conversion program by using input data (401) as an input CL.

In step 302, the computer system sets the following value to the variable:

Aggregate variable M={void enqueue(W w) public W dequeue( )}
Variable i=1
Aggregate variable S={φ}
Aggregate variable C={φ}

In response to the end of the setting, the processing proceeds to step 303.

In the repetition of steps 303 to 305, the computer system executes step 304 with respect to each of m="boolean enqueue(W w)" and m="public W dequeue( )" As a result of the execution, the following is retained in the aggregate variable S:

```
S = {
    <w, (S01,S08), (S02,S03,S04,S05,S06,S07)> (Hereinafter, s1),
    <lock, (S03,S07), (S04,S05,S06)> (Hereinafter, s2),
    <lock, (T01,T09), (T02,T03,T04,T05,T06,T07,T08)>
    (Hereinafter, s3)
}
```

In response to the end of the retention, the processing proceeds to step 306.

In the repetition of steps 306 to 310, the computer system executes steps 307 to 309 for each of s1 to s3 included in the aggregate variable S. As a result of the execution, the following is retained in the aggregate variable C:

```
C = {
    <lock, (T01,T09), (T02,T07,T08)> (Hereinafter, c)
}
```

Here, a path including the line S03 has a side effect of synchronization. Moreover, paths including the lines S04 and T05 have a side effect of assignment to an instance variable. Therefore, the path including the line S03 and the paths including the lines S04 and T05 do not satisfy the condition of step 307. Accordingly, the path including the line S03 and the paths including the lines S04 and T05 are not retained in the aggregate variable C in step 309. Moreover, for example, in the line S02, a local variable w, which is passed from the argument of the method, is referenced. Therefore, the line S02 does not satisfy the condition of step 308. Accordingly, the line S02 is not retained in the aggregate variable C in step 309.

Subsequently, the processing proceeds to step 311. In the repetition of steps 311 to 318, the computer system performs steps 312 to 317 with respect to the information c included in the aggregate variable C.

In steps 312 and 313, the above determination is performed with respect to the information c. Here, "lock" included in the information c is a variable declared with private and not referenced from the outside of the CL. Accordingly, the information c satisfies the conditions of step 312 and step 313 and therefore the processing proceeds to step 314.

In step 314, the computer system adds a statement declaring the variable to the CL. Here, a shared variable "head" is accessed only within s1. Therefore, the computer system adds an instance variable declaration "private static boolean b1" to the CL.

In step 315, the computer system generates a statement "b1=(head !=null)" by using a conditional statement (head !=null) on the line T02. Moreover, "head" is an instance variable, and therefore the computer system removes "static" from the declaration "private static boolean b1" added in step 314.

In step 316, the computer system generates the lines T02, T07, and T08 in a location before the line T01. In addition, the computer system replaces a conditional statement included in c with "(b1)." Since the "then" clause of the line T02 is a branch to a path having a side effect, the computer system causes the "then" clause to be connected to the code to the synchronized block.

FIG. 4B shows a method dequeue( ) after the execution of the processing of step 316 shown in FIG. 3B according to the embodiment of the present invention.

By the processing of step 316, a statement (412) is added to the method dequeue( ) of the CL.

In response to the execution of the addition in step 316, the processing proceeds to step 317.

In step 317, the computer system performs the repetition of steps 322 to 329.

In the repetition of steps 322 to 329, the computer system performs steps 323 to 328 with respect to each of s1 to s3 included in the aggregate variable S.

Among s1 to s3, the following satisfy the condition of step 322:

<lock, (S03, S07), (S04, S05, S06)>(s2) and
<lock, (T01, T09), (T02, T03, T04, T05, T06, T07, T08)>(s3)

In step 323, the computer system determines whether a path related to s2 or s3 satisfying the condition of step 322 includes even one assignment to the variable referenced by the right side of the assignment statement of b0. In s2 or s3, the processing of assignment to head is searched for. As a result of the search, s2 or s3 satisfies the condition of step 323.

In step 324, with respect to the synchronized block represented by the above s2 or s3, the computer system checks on whether a new thread is generated and the generated thread attempts to acquire the same locked object as the synchronized block represented by the above s2 or s3. As a result of the check, it is found that the line S06 of the synchronized block represented by s2 includes processing of invoking method bar(lock) with L0 as an argument.

Here, if only the CL is input, the program code of the program for implementing the method bar(lock) is unknown. Therefore, the computer system causes the user to determine whether the above acquirement is attempted. The computer system inquires of the user by displaying, for example, "Does 'foo.bar(lock)' invoke 'synchronized block' or 'synchronized method' with respect to 'lock' by starting the thread?" on the monitor. If the user selects N, the processing proceeds to step 326. If the user selects Y, the processing proceeds to step 328.

In step 326, the computer system checks on whether the variable defined in the synchronized block represented by s2 or s3 is referenced outside the synchronized block and used to determine the execution sequence of at least two threads. In this regard, the shared variable "lock" on the line S06 is likely to escape from "foo.bar(lock)" and to be accessed from other threads. Therefore, the computer system inquires of the user by displaying, for example, "Is 'lock' used to determine the execution sequence with other threads?" on the monitor. If the user selects N, the processing proceeds to step 327. If the user selects Y, the processing proceeds to step 328 and exits from the above repetition.

In step 327, the computer system determines the location where the statement "b1=(head !=null)" generated in step 315 is added. Since b1 is not declared as volatile, the computer system adds the generated statement in a location after the statement which updates "head." The generated statement is added, for example, in a location after the line S06 with respect to s2, or a location before the line T06 and before the line T08 with respect to s3.

In response to the end of the repetition of steps 322 to 329, the processing proceeds to step 319.

In step 319, the computer system adds "b1=(head !=null);" to the declaration added in step 314.

In response to the addition, the processing ends.

FIG. 4C shows input data after the execution of the processing of steps shown in FIGS. 3A to 3C (hereinafter, the input data is referred to as the program code (421) after the conversion), with respect to FIG. 4A, according to the embodiment of the present invention.

By the processing of steps in FIGS. 3A to 3C, a statement (422) is added to the program code (421) after the conversion.

In the program code (421) after the conversion, b1 is false if head is null. Therefore, if the program code (421) after the conversion is executed and then dequeue( ) method is invoked when head is null, the processing returns null without entering the synchronized block. Therefore, the problem of the lock collision is solved.

FIG. 5A shows input data CL for use in concretely describing the operations of steps shown in FIGS. 3A to 3C according to the embodiment of the present invention.

In the examples shown in FIGS. 5A to 5C, other CLs (not shown) exist in addition to the above CL and the inquiries are not given to the user in steps 325 and 326.

The computer program starts the conversion program by using input data (501) as an input CL.

In step 302, the computer system sets the following values to the variables:
Aggregate variable M={boolean enqueue(W w) public W dequeue( )}
Variable i=1
Aggregate variable S={φ}
Aggregate variable C={φ}

In response to the end of the setting, the processing proceeds to step 303.

In the repetition of steps 303 to 305, the computer system executes step 304 with respect to each of m="boolean enqueue(W w)" and m="public W dequeue( )" By the execution, the following is retained in the aggregate variable S:

---
S = {
  <w, (S01,S08), (S02,S03,S04,S05,S06,S07)> (Hereinafter, s1),
  <lock, (S03,S07), (S04,S05,S06)> (Hereinafter, s2),
  <lock, (T01,T09), (T02,T03,T04,T05,T06,T07,T08)> (Hereinafter, s3)
}
---

In response to the end of the setting, the processing proceeds to step 306.

In the repetition of steps 306 to 310, the computer system executes steps 307 to 309 with respect to each of s1 to s3 included in the above aggregate variable S. As a result of the execution, the following is retained in the aggregate variable C:

---
C = {
  <lock, (T01, T09), (T02, T07, T08)> (Hereinafter, c)
}
---

Here, a path including the line S03 has a side effect of synchronization. Moreover, paths including the lines S04 and T05 have a side effect of assignment to an instance variable. Therefore, the path including the line S03 and the paths including the lines S04 and T05 do not satisfy the condition of step 307. Accordingly, the path including the line S03 and the paths including the lines S04 and T05 are not retained in the aggregate variable C in step 309. Moreover, for example, in the line S02, a local variable w, which is passed from the argument of the method, is referenced. Therefore, the line S02 does not satisfy the condition of step 308. Accordingly, the line S02 is not retained in the aggregate variable C in step 309.

Subsequently, the processing proceeds to step 311.

In the repetition of steps 311 to 318, the computer system performs steps 312 to 317 with respect to the information c included in the aggregate variable C.

In steps 312 and 313, the above determination is performed with respect to the information c. Here, "lock" included in the information c is a variable declared with private and not referenced from the outside of the CL. Accordingly, c satisfies the conditions of step 312 and step 313 and therefore the processing proceeds to step 314.

In step 314, the computer system adds a statement declaring the variable to the CL. Here, a shared variable "head" is accessed only within s1. Therefore, the computer system adds an instance variable declaration "private static boolean b1" to the CL.

In step 315, the computer system generates a statement "b1=(head !=null)" by using a conditional statement (head !=null) on the line T02. Moreover, "head" is an instance variable, and therefore the computer system removes "static" from the declaration "private static boolean b1" added in step 314.

In step 316, the computer system generates the lines T02, T07, and T08 in a location before the line T01. In addition, the computer system replaces a conditional statement included in c with "(b1)." Since the "then" clause of the line T02 is a branch to a path having a side effect, the computer system causes the above "then" clause to be connected to the code to the synchronized block.

FIG. 5B shows a method dequeue( ) after the execution of the processing of step 316 shown in FIG. 3B according to the embodiment of the present invention.

By the processing of step 316, a statement (512) is added to the method dequeue( ) of the CL.

In response to the execution of the addition in step 316, the processing proceeds to step 317.

In step 317, the computer system performs the repetition of steps 322 to 329.

In the repetition of steps 322 to 329, the computer system performs steps 323 to 328 with respect to each of s1 to s3 included in the aggregate variable S.

Among s1 to s3, the following satisfy the condition of step 322:
<lock, (S03, S07), (S04, 505, S06)>(s2) and
<lock, (T01, T09), (T02, T03, T04, T05, T06, T07, T08)>(s3)

In step 323, the computer system determines whether a path related to s2 or s3 satisfying the condition of step 322 includes even one assignment to the variable referenced by the right side of the assignment statement of b0. In s2 or s3, the processing of assignment to head is searched for. As a result of the search, s2 or s3 satisfies the condition of step 323.

In step 324, with respect to the synchronized block represented by the above s2 or s3, the computer system checks on whether a new thread is generated and the generated thread attempts to acquire the same locked object as the synchronized block represented by the above s2 or s3. The synthesized block represented by the above s2 or s3 does not include a statement which generates a new thread. Therefore, the computer system determines in the check that the attempt is not made to acquire the same locked object as the synchronized block represented by the above s2 or s3. In response to the determination of no attempt to acquire the locked object, the processing proceeds to step 326.

In step 326, the computer system checks on whether the variable defined in the synchronized block represented by s2 or s3 is referenced outside the synchronized block and used to determine the execution sequence of at least two threads. In this regard, the shared variable "lock" is declared as private and therefore is not accessed from the outside the CL. Moreover, the shared variable "lock" is accessed only within the synchronized block inside the CL. Therefore, the computer system determines in the check that the shared variable "lock" is not used to determine the execution sequence. In response to the determination of no use, the processing proceeds to step 327.

In step 327, the computer system determines the location where the statement "b1=(head !=null)" generated in step 315 is added. Since b1 is not declared as volatile, the computer system adds the generated statement in a location after the statement which updates "head." The generated statement is added, for example, in a location before the line S06 with respect to s2, or a location before the line T06 and before the line T08 with respect to s3.

In response to the end of the repetition of steps 322 to 329, the processing proceeds to step 319.

In step 319, the computer system adds "b1=(head !=null);" to the declaration added in step 314.

In response to the addition, the processing ends.

FIG. 5C shows input data after the execution of the processing of steps shown in FIGS. 3A to 3C (hereinafter, the input data is referred to as the program code (521) after the conversion), with respect to FIG. 5A, according to the embodiment of the present invention.

By the processing of steps in FIGS. 3A to 3C, a statement (522) is added to the program code (521) after the conversion.

In the program code (521) after the conversion, b1 is false if head is null. Therefore, if the program code (521) after the conversion is executed and then dequeue( ) method is invoked when head is null, the processing returns null without entering the synchronized block. Therefore, the problem of the lock collision is solved.

FIG. 6 shows a part of the program code before the execution of the processing of steps shown in FIGS. 3A to 3C and a part of the program code after the execution of the processing of steps shown in FIGS. 3A to 3C in the case where there are three or more paths to be selected by the first conditional expression, according to the embodiment of the present invention.

The synchronized block of a program code (601) includes two first conditional expressions (x==0) and (y==0). Moreover, three paths (602 to 604) are selected by the foregoing two first conditional expressions. Here, if c1 and c2 are local variables, the path (603) and the path (604) have no side effect. The path (602) includes a statement which updates two variables x and y corresponding to the first variable and therefore has a side effect.

A program code (611) represents a result of the execution of the processing of steps shown in FIGS. 3A to 3C for the program code (601).

In the program code (611), a declaration statement (612) for declaring the second variable, a second conditional statement (613), and a statement (614) generated in step 315 are added to the synchronized block of the program code (601).

In the processing of the above steps, there is prepared a variable capable of taking a value indicating which path is to be selected from the paths having no side effect (603 and 604) for the second variable. Therefore, in the program code (611), there is added the declaration statement (612) declaring a variable b capable of taking "2" as a value for selecting the path (603) and "1" as a value indicating the path (604). Further, in the program code (611), there is added the second statement (613) as a conditional statement used for causing the execution of the paths (603 and 604) having no side effect according to the second variable.

In the program code (611), there is further added the statement (614) generated in step 315, which is a statement for obtaining the value of the variable b in a location immediately after the update statement for updating the first variables x and y.

According to the embodiment of the present invention, it is possible to solve the problem of the lock collision in java.lang.ref.ReferenceQueue by executing steps shown in FIGS. 3A to 3C.

Figure 7:
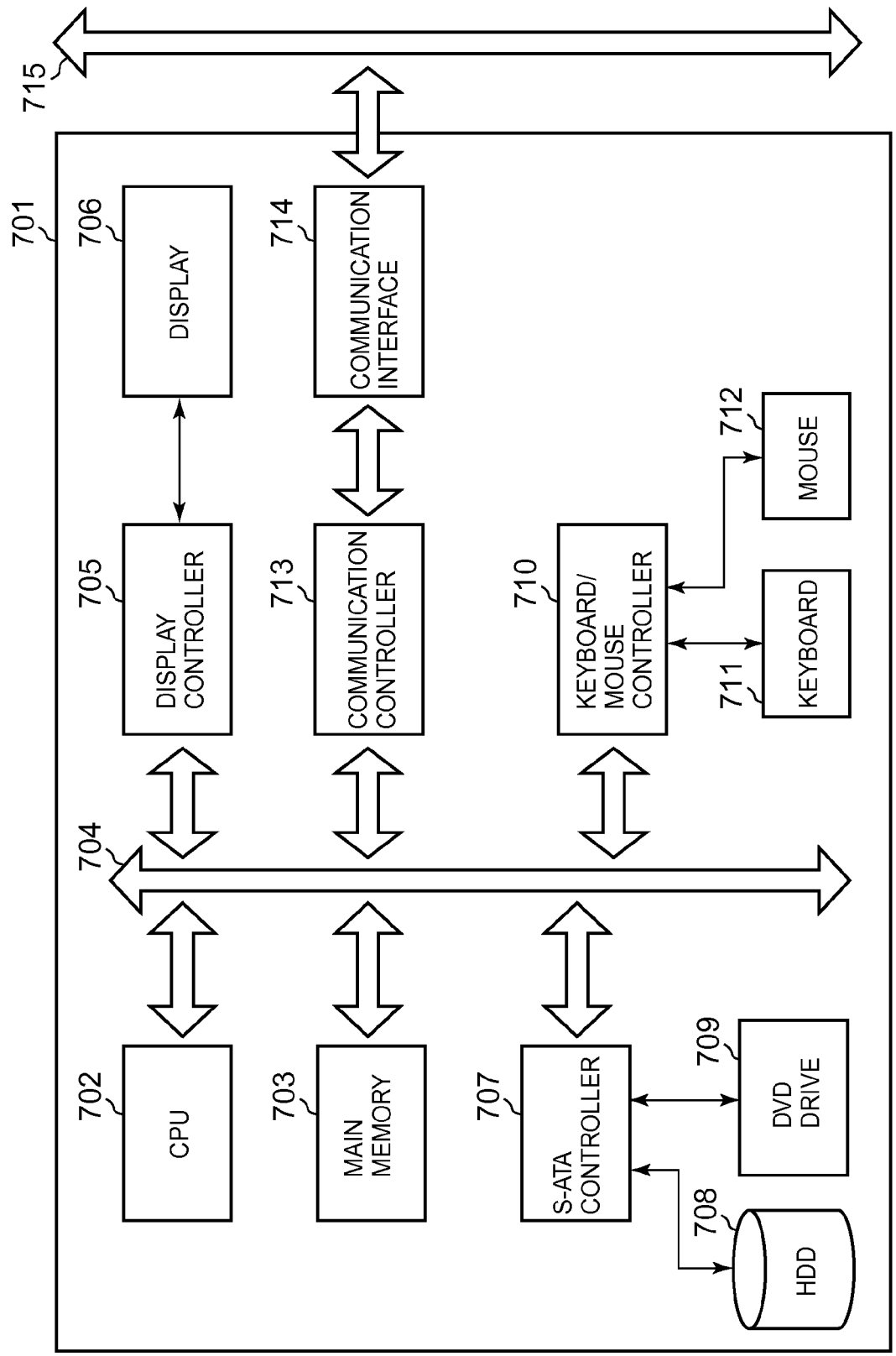
FIG. 7 is a block diagram of computer hardware of the system shown in FIG. 1 according to the embodiment of the present invention.

FIG. 7 shows a block diagram of the computer hardware of the system shown in FIG. 1 according to the embodiment of the present invention.

A computer system (701) according to the embodiment of the present invention includes a CPU (702) and a main memory (703), which are connected to a path (704). The CPU (702) is preferably based on a 32-bit or 64-bit architecture.

For example, it is possible to use Intel Xeon™ series, Intel Core™ series, Intel Atom™ series, Intel Pentium™ series, or Intel Celeron™ series, AMD Phenom™ series, AMD Athlon™ series, AMD Turion™ series, AMD Sempron™, or the like. A display (706) such as an LCD monitor is connected to the bus (704) via a display controller (705). The display (706) is used to display information on a computer system connected to a network via a communication line and information on software under operating conditions in the computer system through an appropriate graphic interface for computer system management. Further, a hard disk or silicon disk (708) and a CD-ROM, DVD drive, or Blu-Ray drive (709) are connected to the bus (704) via an IDE or SATA controller (707).

The hard disk (708) stores, in a form loadable into the main memory (703), an operating system, a program which provides a Java™ processing environment such as J2EE, and other programs and data.

The CD-ROM, DVD, or Blu-ray drive (709) is used to install an additional program on the hard disk from the CD-ROM, DVD-ROM, or Blu-ray disk as required. A keyboard (711) and a mouse (712) are further connected to the bus (704) via a keyboard/mouse controller (710).

A communication interface (714) conforms to the Ethernet™ protocol. The communication interface (714) is connected to the bus (704) via a communication controller (713) to serve to physically connect the computer system and the communication circuit (715) and to provide the TCP/IP communication protocol of the communication capability of the operating system of the computer system with a network interface layer. The communication circuit may be in a cabled LAN environment or a wireless LAN environment which conforms to the wireless LAN connection specifications such as IEEE802.11a/b/g/n.

I claim:

1. A method of converting a program code running in multi-thread to a program code which causes fewer lock collisions, the method comprising:
reading a program code into a memory;
searching said program code for a first conditional statement making a branch to a path, wherein said path is in a synchronized block;
determining that the path has no side effect on the synchronized block, based on the path having a first value under processing that is unable to be referenced outside the synchronized block;
duplicating the path having no side effect to the outside of the synchronized block; and
adding, by a computer processor, a second conditional statement into the program code in response to the duplication, wherein the second conditional statement is a conditional statement making a branch to the duplicated path having no side effect.

2. The method according to claim 1, wherein the first conditional statement includes a first conditional expression which is defined so as to cause a selection of a path based on a readout selected from the group consisting of a first variable, a constant, and a combination of the variable and the constant.

3. The method according to claim 2, wherein the second conditional statement includes a second conditional expression which causes a selection of a path according to a result of the first conditional expression on the basis of a variable for storing the result of the first conditional expression.

4. The method according to claim 3, further comprising:
searching the program code for an update statement, wherein the update statement exists in the synchronized block and updates the first variable; and
adding a statement including the variable for storing the result of the first conditional expression and the result of the first conditional expression assigned to the variable in a range from immediately after the searched update statement to the last statement in the synchronized block.

5. The method according to claim 3, further comprising:
searching at least one of the program code and other program codes for an update statement, wherein the update statement exists in any other synchronized block which is synchronized with the synchronized block and updates the first variable; and
adding a statement which includes the variable for storing the result of the first conditional expression and the result of the first conditional expression assigned to the variable in the range from immediately after the searched update statement to the last statement in the any other synchronized block.

6. The method according to claim 3, further comprising:
adding a statement which initializes the variable for storing the result of the first conditional expression by using a value by which the second conditional statement causes the execution of a path including the synchronized block wherein adding the statement occurs in a location before the statement in which the variable for storing the result of the first conditional expression is referenced for the first time.

7. The method according to claim 3, further comprising:
adding a statement which initializes the variable for storing the result of the first conditional expression by using the result of the first conditional expression wherein adding the statement occurs in a location before the statement in which the variable for storing the result of the first conditional expression is referenced for the first time.

8. The method according to claim 3, wherein the variable for storing the result of the first conditional expression corresponds to each path having no side effect among three or more paths in response to the first conditional expression selecting at least three paths.

9. The method according to claim 3, wherein the variable for storing the result of the first conditional expression is a variable of data type for which atomicity is ensured.

10. The method according to claim 3, further comprising:
adding a statement which declares the variable for storing the result of the first conditional expression to the program code;
including, by the declaration, a specification of inhibiting optimization of an access sequence in the memory and a specification of ensuring atomicity in response to a shared variable being included in at least one of the program code and the other program codes and accessed from the statement outside the synchronized block wherein the shared variable is included in the path having no side effect and is able to be accessed from a plurality of threads; and
including, by the declaration, a specification of ensuring atomicity in response to the shared variable not being accessed.

11. The method according to claim 2, wherein in response to a plurality of first conditional expressions, the result of the two or more first conditional expressions is obtained by a combination of the two or more first conditional expressions.

12. The method according to claim 2, further comprising:
searching for a statement which is included in at least one of the program code and other program codes and which references the first variable from a statement outside the synchronized block; and executing the duplicating in response to the end of the search.

13. The method according to claim 2, further comprising:
allowing the user to decide whether there is a statement referencing the first variable; and
executing the duplicating after the allowing.

14. The method according to claim 1, further comprising:
searching at least one of the program code and other program codes for any other synchronized block which is synchronized with the synchronized block; and
executing the duplicating in response to the end of the search.

15. The method according to claim 1, wherein, when the synchronized block includes a statement starting a thread, the method further comprises:
searching statements which are executed on the thread and are included in at least one of the program code and other program codes for a statement which is executed in synchronization with the statement in the synchronized block from; and
determining a path including the statement starting the thread to be a path having a side effect in response to the search for the statement executed in synchronization with the statement in the synchronized block.

16. The method according to claim 1, wherein the method further comprises:
requiring a user to decide that the path including the statement starting the thread is a path having no side effect.

17. The method according to claim 1, wherein when the variable is defined in the synchronized block in which the variable is used to determine the execution sequence of threads and where the synchronized block is executed, the method further comprises:
searching for a statement which is included in at least one of the program code and other program codes and references the used variable from outside the synchronized block; and
determining a path including the used variable to be a path having a side effect in response to the search for the statement referencing the used variable.

18. The method according to claim 1, wherein when the variable is defined in the synchronized block in which the variable is used to determine the execution sequence of threads and where the synchronized block is executed, the method further comprises:
requiring the user to decide whether the path including the used variable is a path having no side effect.

19. The method according to claim 1, further comprising:
allowing the user to decide whether there is any other synchronized block which is synchronized with the synchronized block; and
executing the duplicating after the allowing.

20. A non-transitory computer readable storage medium tangibly embodying a computer readable program which, when executed, causes a computer to carry out a method for converting a program code of a program running in a multi-thread to a program code which causes fewer lock collisions, the method comprising:
reading a program code into a memory and searching the readout program code for a first conditional statement making a branch to a path, wherein the path is in a synchronized block;
determining that the path has no side effect on the synchronized block, based on the path having a first value under processing that is unable to be referenced outside the synchronized block;
duplicating the path having no side effect to the outside of the synchronized block; and
adding, by a computer processor, a second conditional statement into the program code in response to the duplication, wherein the second conditional statement is a conditional statement making a branch to the duplicated path having no side effect.

21. A computer system for converting a program code of a program running in a multi-thread to a program code which causes fewer lock collisions, the system comprising:
a search unit for reading a program code into a memory and searching the program code for a first conditional statement making a branch to a path, which is in a synchronized block and has no side effect on the synchronized block, wherein the term "no side effect" means that a value under processing by a statement in the synchronized block is unable to be referenced by a statement outside the synchronized block;
a duplicating unit for duplicating the path having no side effect to which the branch is made by the searched first conditional statement into the outside of the synchronized block; and
an addition unit for adding a second conditional statement into the program code in response to the duplication, wherein the second conditional statement is a conditional statement making a branch to the duplicated path having no side effect.

* * * * *